(12) United States Patent
Green et al.

(10) Patent No.: US 8,996,712 B2
(45) Date of Patent: Mar. 31, 2015

(54) SYSTEMS, METHODS AND ARTICLES TO PROVIDE CONTENT IN NETWORKED ENVIRONMENT

(71) Applicant: Abacast, Inc., Vancouver, WA (US)

(72) Inventors: Robert D. Green, Seattle, WA (US); James M. Kott, Kirkland, WA (US); John W. Morris, IV, Washougal, WA (US); Brian S. Bosworth, Edgewater, MD (US)

(73) Assignee: Wideorbit Inc., San Francisco, CA (US)

( * ) Notice: Subject to any disclaimer, the term of this patent is extended or adjusted under 35 U.S.C. 154(b) by 309 days.

(21) Appl. No.: 13/744,139

(22) Filed: Jan. 17, 2013

(65) Prior Publication Data

US 2013/0198328 A1    Aug. 1, 2013

Related U.S. Application Data

(60) Provisional application No. 61/587,475, filed on Jan. 17, 2012.

(51) Int. Cl.
*G06F 15/16* (2006.01)
*H04L 29/08* (2006.01)
*H04N 21/6373* (2011.01)
*G06Q 30/02* (2012.01)
*H04L 29/06* (2006.01)

(52) U.S. Cl.
CPC ............ *H04L 67/02* (2013.01); *H04N 21/6373* (2013.01); *G06Q 30/0276* (2013.01); *H04L 65/4076* (2013.01); *H04L 65/607* (2013.01)
USPC ............................ 709/231; 709/233; 707/711

(58) Field of Classification Search
CPC ........................... H04N 21/6573; H04N 9/822
USPC ............ 709/231, 233; 707/711, 830; 725/116
See application file for complete search history.

(56) References Cited

U.S. PATENT DOCUMENTS

| | | |
|---|---|---|
| 6,487,721 B1 | 11/2002 | Safadi |
| 6,577,716 B1 | 6/2003 | Minter et al. |
| 7,412,714 B2 | 8/2008 | Kitayama |
| 7,676,405 B2 | 3/2010 | Steelberg et al. |
| 7,752,642 B2 | 7/2010 | Lemmons |
| 7,925,774 B2 * | 4/2011 | Zhang et al. .................. 709/231 |
| 8,230,037 B2 | 7/2012 | Story et al. |

(Continued)

OTHER PUBLICATIONS

Green et al., "Systems, Methods and Articles to Automatically Expose and Place Material in Streams of Programming," U.S. Appl. No. 61/561,186, filed Nov. 17, 2011, 70 pages.

(Continued)

*Primary Examiner* — Khanh Dinh
(74) *Attorney, Agent, or Firm* — Seed IP Law Group PLLC

(57) ABSTRACT

Content delivery is provided responsive to content consumer requests by providing dynamically generated manifests to content consumers, the manifests providing retrieval information to retrieve content or media fragments of content from segments of a broadcast or Webcast and alternative or replacement content. Alternative or replacement content may be targeted, for example selected based in part on characteristics associated with the content consumer. Content fragments may be cached with CDNs, for example based on a defined preference. Actual insertion of alternative content may occur upstream of a content consumer device or at the content consumer device.

36 Claims, 9 Drawing Sheets

(56) References Cited

U.S. PATENT DOCUMENTS

| | | | |
|---|---|---|---|
| 8,812,637 | B2 | 8/2014 | Cragun et al. |
| 8,819,754 | B2 * | 8/2014 | Virdi et al. ................... 725/114 |
| 8,893,208 | B2 * | 11/2014 | Ma et al. ....................... 725/116 |
| 2001/0023498 | A1 | 9/2001 | Cosmao et al. |
| 2002/0078443 | A1 | 6/2002 | Gadkari et al. |
| 2003/0033157 | A1 | 2/2003 | Dempski et al. |
| 2003/0188320 | A1 | 10/2003 | Shing |
| 2004/0025176 | A1 | 2/2004 | Franklin et al. |
| 2004/0088726 | A1 | 5/2004 | Ma et al. |
| 2004/0128682 | A1 | 7/2004 | Liga et al. |
| 2004/0133467 | A1 | 7/2004 | Siler |
| 2007/0074243 | A1 | 3/2007 | Verhaegh et al. |
| 2007/0220411 | A1 | 9/2007 | Hauser |
| 2008/0120638 | A1 | 5/2008 | King et al. |
| 2009/0031037 | A1 | 1/2009 | Mendell et al. |
| 2010/0269138 | A1 | 10/2010 | Krikorian et al. |
| 2010/0280889 | A1 | 11/2010 | Gabriel et al. |
| 2010/0293046 | A1 | 11/2010 | Cooke et al. |
| 2013/0132997 | A1 | 5/2013 | King et al. |
| 2013/0144723 | A1 | 6/2013 | Green et al. |
| 2013/0198328 | A1 * | 8/2013 | Green et al. ................... 709/217 |
| 2013/0246567 | A1 | 9/2013 | Green et al. |
| 2013/0282495 | A1 | 10/2013 | Gilbane et al. |
| 2014/0068648 | A1 | 3/2014 | Green et al. |

OTHER PUBLICATIONS

Green et al., "Systems, Methods and Articles to Provide Content in Networked Environment," U.S. Appl. No. 61/587,475, filed Jan. 17, 2012, 98 pages.
Green et al., "Systems and Methods to Deliver a Personalized Mediacast," U.S. Appl. No. 61/611,403, filed Mar. 15, 2012, 75 pages.
Green et al., "Systems and Methods to Deliver a Personalized Mediacast With an Uninterrupted Lead-In Portion," U.S. Appl. No. 61/877,182, filed Sep. 12, 2013, 171 pages.
Green et al., "Systems, Methods and Articles to Provide Content in Networked Environment," U.S. Appl. No. 61/677,968, filed Jul. 31, 2012, 84 pages.
Green et al., "Systems, Methods and Articles to Provide Content in Networked Environment," Office Action mailed Apr. 11, 2014, for U.S. Appl. No. 13/956,020, 13 pages.
King et al., "Content Injection System and Methodology," Office Action mailed Jul. 7, 2010, for U.S. Appl. No. 11/985,143, 12 pages.
King et al., "Content Injection System and Methodology," Amendment filed Jan. 7, 2011, for U.S. Appl. No. 11/985,143, 11 pages.
King et al., "Content Injection System and Methodology," Supplementary Response filed Jan. 20, 2011, for U.S. Appl. No. 11/985,143, 13 pages.
King et al., "Content Injection System and Methodology," Office Action mailed Mar. 29, 2011, for U.S. Appl. No. 11/985,143, 15 pages.
King et al., "Content Injection System and Methodology," Amendment filed May 27, 2011, for U.S. Appl. No. 11/985,143, 21 pages.
King et al., "Content Injection System and Methodology," Office Action mailed Feb. 21, 2012, for U.S. Appl. No. 11/985,143, 14 pages.
King et al., "Content Injection System and Methodology," Amendment filed Jul. 6, 2012, for U.S. Appl. No. 11/985,143, 25 pages.
King et al., "Content Injection System and Methodology," Notice of Allowance mailed Oct. 15, 2012, for U.S. Appl. No. 11/985,143, 16 pages.
King et al., "Content Injection System and Methodology," U.S. Appl. No. 60/860,573, filed Nov. 21, 2006, 7 pages.
Green et al., "Systems, Methods and Articles to Automatically Expose and Place Material in Streams Of Programming," Office Action mailed May 14, 2014, for U.S. Appl. No. 13/679,828, 49 pages.
Green et al., "Systems and Methods to Deliver a Personalized Mediacast," Notice of Allowance mailed Nov. 6, 2014, for U.S. Appl. No. 13/711,984, 22 pages.
Green et al., "Systems and Methods to Deliver a Personalized Mediacast With an Uninterrupted Lead-In Portion," U.S. Appl. No. 14/485,416, filed Sep. 12, 2014, 171 pages.
Green et al., "Systems and Methods to Delver a Persanalized Mediacast With an Uninterrupted Lead-In Portion," Preliminary Amendment filed Sep. 15, 2014, for U.S. Appl. No. 14/485,416, 13 pages.
Green et al., "Systems and Methods to Identify Video Content Types," U.S. Appl. No. 61/992,662, filed May 13, 2014, 100 pages.
Green et al., "Systems, Methods and Articles to Automatically Expose and Place Material in Streams of Programming," Amendment filed Oct. 13, 2014, for U.S. Appl. No. 13/679,828, 20 pages.
Green et al., "Systems, Methods and Articles to Provide Content in Networked Environment," Amendment filed Sep. 11, 2014, for U.S. Appl. No. 13/956,020, 15 pages.
Green et al., "Systems, Methods and Articles to Provide Content in Networked Environment," Office Action mailed Oct. 7, 2014, for U.S. Appl. No. 13/956,020, 15 pages.

* cited by examiner

SYSTEMS, METHODS AND ARTICLES TO PROVIDE CONTENT IN NETWORKED ENVIRONMENT

BACKGROUND

1. Field

This disclosure generally relates to the automated provision of content to content consumers in a networked environment in a modified form from content broadcast or Webcast by content providers, and more particularly to insertion of alternative content segments into a sequence of content segments, for example, insertion of alternative advertisements into Webcasts or other delivery of content.

2. Description of the Related Art

Content providers such as radio stations and networks, television stations and networks, and Webcasters provide programming including content which is the subject of programming. Content providers' delivery of content is often via broadcasts or Webcasts. While content providers may employ repeaters and the like, broadcasts are typically limited in range to a geographic region.

Programming often includes advertisements interspersed with the subject matter of the programming. The advertisements may occur in segments sometimes referred to as "ad breaks." Content providers typically sell advertising time to generate revenue to fund operation, as well as generate profits, where the content provider is a commercial entity rather than a nonprofit entity. Given that most broadcasts are local in nature or extent, content providers often carry advertisements and other material which is of a somewhat local or parochial interest. For example, a local chain may place advertisements with a local broadcaster since the audience targeted by the local chain is also often local and local advertising tends to be less expensive than regional or national advertising.

Often, content providers provide an alternative source of the programming, for example, providing a Webcast or even a podcast of the programming. The audience for the alternative source of programming may be significantly different from the audience for the broadcast. For example, the audience for the alternative source of programming may be more geographically diverse, or may be more comfortable with technologies such as streaming of content to desktop computers or even Smartphone devices. As such, the advertisements interspersed in a broadcast may not be particularly well suited, applicable or of interest to the audience of the alternative source of programming.

Content providers are increasingly using content delivery networks (CDNs) to cache content throughout a network. CDNs are typically a system of computers, often configured as servers, and may be geographically dispersed with respect to one another. CDNs are typically operated by third party entities. CDNs may improve access, for example allowing lowest cost routing and reducing latency. CDNs may also provide a measure of redundancy.

New approaches that automate the various activities related to providing requested content, customized or otherwise modified with or by the insertion of new or replacement materials, for instance, new or replacement advertisements, in an alternative programming stream are desirable.

BRIEF SUMMARY

In summary, manifests are dynamically generated as each manifest request is issued. The dynamically generated manifests provide retrieval, and order or sequence, information for content or media fragments which encode some content of a programming or sequence of content, such as a terrestrial broadcast or Webcast. The content or media fragments also include some alternative or replacement content, which may replace or substitute for some of the content in the programming which is considered or marked as replaceable content. The alternative or replacement content may be targeted to a content consumer, for example selected based on one or more characteristics associated with the content consumer or content consumer device.

The system may, for example, simply try to replace replaceable content from the programming with alternative or replacement content of a same duration. Alternative, the system may employ alternate content having a longer duration or combined duration than the replaceable content segment(s) of the programming, for example via buffering. For instance, the system could hold on to or buffer the store of packets that arrive while alternative or replacement content is still playing, and then simply replay from that buffer. This essentially enables variable length alternative content insertion and primary stream buffering. Such eliminates the need to perform precise substitution, or even the need to perform substitution at all.

A method of providing content to content consumers in a networked environment may be summarized as including for each of a number of content consumer requests for a broadcast or a Webcast comprising a plurality of content segments, generating a respective manifest by at least one processor, by: for at least some of a plurality of content fragments generated from the broadcast or the Webcast from any of the content segments of the broadcast or the Webcast which are indicated as being nonreplaceable portions of the broadcast or Webcast, including a respective set of information that indicates a respective logical network location from which to acquire the respective content fragment; for at least some of a plurality of content fragments generated from the broadcast or the Webcast from any of the content segments of the broadcast or Webcast which are indicated as being replaceable portions of the broadcast or Webcast, including a respective set of information that indicates a respective logical network location from which to acquire respective replacement content fragments, the replacement content fragments having content that is different from content of a respective one of the content fragments which the replacement content is to replace; and specifying an order of presentation of the content fragments of the respective manifest.

The method of providing content to content consumers in a networked environment may further include selecting a replacement content segment based at least in part on an identity of a content consumer associated with the respective content consumer request. Selecting a replacement content segment based at least in part on an identity of a content consumer may include selecting the replacement content segment based at least in part on at least one of a geographic location of the content consumer, a browsing history of the content consumer, a buying history of the content consumer, or a piece of self reported information provided by the content consumer.

The method of providing content to content consumers in a networked environment may further include selecting a replacement content segment based at least in part on an optimized revenue generation determination. Selecting a replacement content segment may further be based at least in part on an approximate match between a duration of the replacement content segment and a duration of the content segment to be replaced.

The method of providing content to content consumers in a networked environment may further include selecting a replacement content segment on a replacement content manager component remotely located from a manifest generator component which generates the respective manifests.

The method of providing content to content consumers in a networked environment may further include receiving the broadcast or the Webcast, the broadcast or the Webcast including the content segments and associated metadata; and for each of a number of the content segments of the broadcast or the Webcast, detecting metadata indicative of whether the respective content segment is nonreplaceable or replaceable.

The method of providing content to content consumers in a networked environment may further include replacing each of at least some of the content segments of the broadcast or the Webcast identified as being replaceable with at least one replacement content segment; and encoding the content segments identified as nonreplaceable and the replacement content segments as the content fragments.

The method of providing content to content consumers in a networked environment may further include providing the content fragments to a number of content delivery networks for retrieval of the content fragments by the content consumers.

The method of providing content to content consumers in a networked environment may further include providing the respective manifest to the content consumer that generated the content consumer request. Replacing and the encoding may be performed on a content insertion component which is collocated with a content source and are not communicatively accessible by the content consumers.

The method of providing content to content consumers in a networked environment may further include generating the plurality of content fragments such that for each any of the content segments of the broadcast or Webcast which are indicated as being replaceable portions of the broadcast or Webcast, a start and an end of the respective content segment occurs at a start or an end of one of a respective one the content fragments.

The method of providing content to content consumers in a networked environment may further include encoding the content segments identified as nonreplaceable content by a first fragment encoder; and encoding the replacement content segments by a second fragment encoder, separate and remote from the first content encoder.

A content delivery system to deliver content in a networked environment may be summarized as including a manifest generator comprising at least one processor and at least one nontransitory processor readable storage medium communicatively coupled to the at least one processor and which stores instructions executable by the at least one processor which causes the manifest generator to generate a respective manifest for each of a number of content consumer requests for a broadcast or a Webcast comprising a plurality of content segments, by: for at least some of a plurality of content fragments generated from the broadcast or the Webcast from any of the content segments of the broadcast or the Webcast which are indicated as being nonreplaceable portions of the broadcast or Webcast, including a respective set of information that indicates a respective logical network location from which to acquire the respective content fragment; for at least some of a plurality of content fragments generated from the broadcast or the Webcast from any of the content segments of the broadcast or Webcast which are indicated as being replaceable portions of the broadcast or Webcast, including a respective set of information that indicates a respective logical network location from which to acquire respective replacement content fragments, the replacement content fragments having content that is different from content of a respective one of the content fragments indicated as being replaceable; and specifying an order of presentation of the content fragments of the respective manifest; and which further causes the manifest generator to provide the respective manifest to a content consumer that generated the content consumer request.

The content delivery system to deliver content in a networked environment may further include a content replacement selection component comprising at least one processor and at least one nontransitory processor readable storage medium communicatively coupled to the at least one processor and which stores instructions executable by the at least one processor which causes the content replacement selection component to select replacement content segments based at least in part on an identity of a content consumer includes selecting the replacement content segment based at least in part on at least one of a geographic location of the content consumer, a browsing history of the content consumer, a buying history of the content consumer, or a piece of self reported information provided by the content consumer. The content replacement selection component may select replacement content segments based at least in part on an optimized revenue generation determination. The content replacement selection component may select replacement content segments based at least in part minimizing a delay between a presentation of the content of the broadcast or Webcast with the replacement and the presentation of the content of the broadcast or Webcast without the replacement.

The content delivery system to deliver content in a networked environment may further include an insertion component comprising at least one processor and at least one nontransitory processor readable storage medium communicatively coupled to the at least one processor and which stores instructions executable by the at least one processor which causes the insertion component to: receive the broadcast or the Webcast, the broadcast or the Webcast including the content segments and associated metadata; for each of a number of the content segments of the broadcast or the Webcast, detect metadata indicative of whether the respective content segment is nonreplaceable or replaceable; replace each of at least some of the content segments of the broadcast or the Webcast identified as being replaceable with at least one replacement content segment; and encode the content segments identified as nonreplaceable and the replacement content segments as the content fragments; and provide the content fragments to a number of content delivery networks for retrieval of the content fragments by the content consumers. The manifest generation component may be communicatively accessible by the content consumer, the content replacement selection component may be communicatively accessible by at least one of an advertiser or an advertiser network and may not be communicatively accessible by the content consumer, and the insertion component may be located remotely from the content replacement selection component and may be collocated with a content source and are not communicatively accessible by the content consumer.

The content delivery system to deliver content in a networked environment may further include a fragment encoder that generates the plurality of content fragments such that for each any of the content segments of the broadcast or Webcast which are indicated as being replaceable portions of the broadcast or Webcast, a start and an end of the respective content segment occurs at a start or an end of one of a respective one the content fragments.

The content delivery system to deliver content in a networked environment may further include a first fragment encoder that encode the content segments identified as nonreplaceable content; and a second fragment encoder that encodes the replacement content segments separately and remotely from the first content encoder.

A method of providing content to a plurality of content consumer clients in a networked environment where at least some of the content is from a plurality of broadcasts or Webcasts by a number of broadcast or Webcast content providers, each broadcast or Webcast comprising a plurality of sequential content segments may be summarized as including for a plurality of the content segments identified by a respective set of metadata as replaceable, identifying a number of alternate content segments by an alternative content selection component that includes at least one processor and at least one nontransitory storage medium communicatively coupled to the at least one processor, the alternate content segments to be used to replace at least some of the content segments of the broadcast or the Webcast which are identified by the respective set of metadata as replaceable; in response to a plurality of requests by a plurality of content consumer clients for the broadcasts or the Webcasts, dynamically generating a plurality of respective manifests by a manifest generator component that includes at least one processor and at least one nontransitory storage medium communicatively coupled to the at least one processor, each of the dynamically generated manifests providing information that identifies one or more network locations for retrieval of one or more content fragments for each of the alternative content segments identified to replace the content segments of the respective requested broadcast or Webcast which are identified by the sets of metadata as being replaceable as well as one or more content fragments for each content segment of the respective requested broadcast or Webcast which are not identified by the sets of metadata as being replaceable; and transmitting the dynamically generated manifests to respective content consumers that requested the broadcast or the Webcast.

The alternative content selection component may provide a dedicated interface for advertisers and advertiser networks and may be communicatively isolated from receiving requests from the content consumer clients, and may further include receiving information from at least one advertiser or at least one advertiser network that specifies at least one content delivery network preference; and wherein dynamically generating a plurality of respective manifests by a manifest generator component may include dynamically generating at least some of respective manifests to reflect the specified at least one content delivery network preference.

The method of providing content to a plurality of content consumer clients in a networked environment where at least some of the content is from a plurality of broadcasts or Webcasts by a number of broadcast or Webcast content providers, each broadcast or Webcast comprising a plurality of sequential content segments may further include causing content fragments to be cached with a number of preferred content delivery networks as specified by the at least one content delivery network preference. The alternative content selection component may provide a dedicated interface for advertisers and advertiser networks and may be communicatively isolated from receiving requests from the content consumer clients, and may further include receiving information from at least one advertiser or at least one advertiser network that specifies targeted demographic information; and wherein dynamically generating a plurality of respective manifests by a manifest generator component may include dynamically generating at least some of respective manifests to include alternative content segments selected based at least in part based on the specified targeted demographic information.

Identifying a number of alternate content segments by an alternative content selection component may include identifying at least some of the alternative content segments based at least in part on an optimization of revenue generated by the alternative content segments. Identifying a number of alternate content segments by an alternative content selection component may include identifying alternative content segments based at least in part on at least one of a geographic location of the content consumer client, a browsing history of a content consumer associated with the content consumer client, a buying history of the content consumer associated with the content consumer client, or a piece of self reported information provided by the content consumer associated with the content consumer client.

The method of providing content to a plurality of content consumer clients in a networked environment where at least some of the content is from a plurality of broadcasts or Webcasts by a number of broadcast or Webcast content providers, each broadcast or Webcast comprising a plurality of sequential content segments may further include replacing each of at least some of the content segments of the broadcast or the Webcast identified as being replaceable with at least one alternative content segment by a content insertion component which is collocated with a content source and are not communicatively accessible by the content consumers; encoding as a plurality of content fragments the alternative content segments and the content segments which are not identified by the sets of metadata as being replaceable; and providing the content fragments to a number of content delivery networks for retrieval of the content fragments by the content consumers.

A content delivery system to provide content to a plurality of content consumer clients in a networked environment where at least some of the content is from a plurality of broadcasts or Webcasts by a number of broadcast or Webcast content providers, each broadcast or Webcast comprising a plurality of sequential content segments may be summarized as including an alternative content selection component that includes at least one processor and at least one nontransitory storage medium communicatively coupled to the at least one processor, and which, for a plurality of the content segments identified by a respective set of metadata as replaceable, identifies a number of alternate content segments to be used to replace at least some of the content segments of the broadcast or the Webcast which are identified by the respective set of metadata as replaceable; and a manifest generator component that includes at least one processor and at least one nontransitory storage medium communicatively coupled to the at least one processor, and that, in response to a plurality of requests by a plurality of content consumer clients for the broadcasts or the Webcasts, dynamically generates a plurality of respective manifests each of the dynamically generated manifests providing information that identifies one or more network locations for retrieval of one or more content fragments for each of the alternative content segments identified to replace the content segments of the respective requested broadcast or Webcast which are identified by the sets of metadata as being replaceable as well as one or more content fragments for each content segment of the respective requested broadcast or Webcast which are not identified by the sets of metadata as being replaceable; and that transmits the dynamically generated manifests to respective content consumers that requested the broadcast or the Webcast.

The alternative content selection component may provide a dedicated interface for advertisers and advertiser networks and may be communicatively isolated from receiving requests from the content consumer clients, and may further receive information from at least one advertiser or at least one advertiser network that specifies at least one content delivery network preference; and may dynamically generate at least some of respective manifests to reflect the specified at least one content delivery network preference.

The alternative content selection component may provide a dedicated interface for advertisers and advertiser networks and may be communicatively isolated from receiving requests from the content consumer clients, and may further receive information from at least one advertiser or at least one advertiser network that specifies targeted demographic information; and may dynamically generate at least some of respective manifests to include alternative content segments selected based at least in part based on the specified targeted demographic information.

The alternative content selection component may identify at least some of the alternative content segments based at least in part on an optimization of revenue generated by the alternative content segments. The alternative content selection component may identify at least some of the alternate content segments based at least in part on at least one of a geographic location of the content consumer client, a browsing history of a content consumer associated with the content consumer client, a buying history of the content consumer associated with the content consumer client, or a piece of self reported information provided by the content consumer associated with the content consumer client.

The method may include receiving encrypted content fragments from each of a plurality of fragment encoders by a Web-based portal; decrypting the received content fragments; and distributing the decrypted content fragments to selected ones of a plurality of content delivery networks from the Web-based portal.

A content delivery system to provide content to a plurality of content consumer clients in a networked environment where at least some of the content is from a plurality of broadcasts or Webcasts by a number of broadcast or Webcast content providers, each broadcast or Webcast comprising a plurality of sequential content segments may further include a content insertion component which is collocated with a content source and are not communicatively accessible by the content consumers, the content insertion component including at least one processor and at least one nontransitory storage medium communicatively coupled with the at least one processor, and which may replace each of at least some of the content segments of the broadcast or the Webcast identified as being replaceable with at least one alternative content segment encoding as a plurality of content fragments the alternative content segments and the content segments which are not identified by the sets of metadata as being replaceable; and may provide the content fragments to a number of content delivery networks for retrieval of the content fragments by the content consumers.

The content delivery system may include a Web-based portal that receives encrypted content fragments from each of a plurality of fragment encoders, decrypts the content fragments, and distributes the decrypted content fragments to selected ones of a plurality of content delivery networks.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, broadcast systems including radio and television broadcast systems, as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Networked Environment Overview

Figure 1:
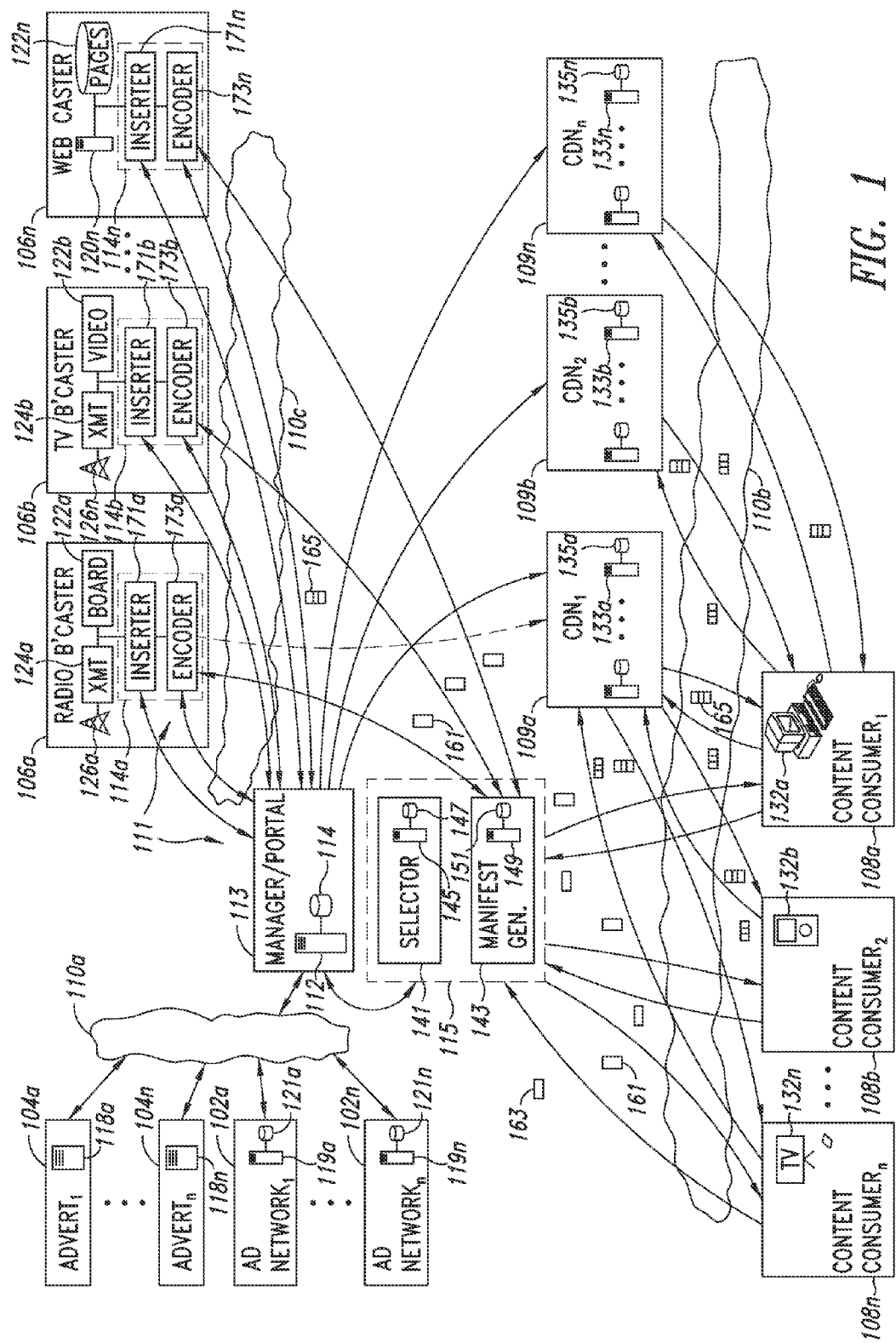
FIG. 1 is a schematic diagram of a networked environment, including a number of advertiser and/or advertising network server computer systems, a number of content providers (e.g., terrestrial radio or television providers or Webcasters) and associated content provider systems, a number of content consumers and associated content consumer devices (e.g., computers, smartphones, tablets, Internet enabled televisions), a number of content delivery networks (CDNs), and a content delivery system that includes a manager/portal computer system communicatively coupled to the advertisers and advertiser network computer systems, a number of inserters, a number of fragment encoder systems, and alternative content selector and manifest generator computer systems communicatively coupled to dynamically generate manifests and supply the dynamically generated manifest to content consumer devices and to the insertion and fragment encoder system, according to one illustrated embodiment.

FIG. 1 shows a networked environment 100, according to one illustrated embodiment in which various apparatus, methods and articles described herein may operate.

The networked environment 100 includes a number of advertiser networks 102a-102n (two illustrated, collectively 102), a number of advertisers 104a-104n (two illustrated, collectively 104), a number of content providers 106a, 106b-106n (three illustrated, collectively 106), a number of end users or content consumers 108a-108n (two illustrated, collectively 108), and a number of content delivery networks 109a, 109b-109n.

The environment 100 also includes a content delivery system 111 which includes a number of alternative content manager and/or portal systems 113, a number of alternative content selector and manifest generator systems 115, and a number of fragment encoder systems 173a, 173b-173n (collectively 173) and optionally a number of alternative content inserters 171a, 171b-171n (collectively 171).

The advertiser networks 102 are generally entities that connect advertisers with Websites or other content providers which wish to host advertisements. Advertiser networks 102 typically aggregate advertisement opportunities, commonly referred to as "advertising space" from various content providers (e.g., television or radio stations, Webcasters), and match the advertisement opportunities with advertiser demands. "Online" advertisement networks typically employ a central advertisement server to deliver advertisements to content consumers. Such allows targeting of advertisements to content consumers based on demographics, as well as tracking of responses to advertisements and the reporting of impressions.

The advertiser networks 104 each include one or more advertiser network computer systems 119a-119n (collectively 119, only two shown). The advertiser network computer systems 119 may take any of a large variety of forms, including personal or microcomputers, including laptop and desktop computers, minicomputers, workstations, server computers, and even mainframe computers. The advertiser networks 104 may also include one or more non-transitory storage media (e.g., hard drives, solid state drives, tape) 121a-121n (collectively 121, only two shown) that store advertisements and related information, which may be communicatively coupled to the advertiser network computer systems 119. The advertiser network computer systems 119 are communicatively coupled to provide alternative content, for example alternative advertisement content (i.e., advertisements) and related information to the alternative content manager or portal 113. The related information may specify advertisement placement criteria, for example, length of advertisement, type of media or format, language, general population target demographics, specific individual target demographics. The advertiser network computer systems 119 may be communicatively coupled to the alternative content manager or portal 113 via a private network (e.g., virtual private network) 110a, or alternatively via a public network infrastructure, for instance the Internet or Worldwide Web.

The advertisers 104 are generally the source of advertising content, or other alternative content, to be inserted in a stream or flow of media (e.g., radio broadcast, television broadcast, Webcast). The advertisers 104 may be the subject of the advertising content, for instance, a company or other entity which the advertisement is about or advertises. Alternatively, the advertisers 104 may be an originator or creator of the advertisement or otherwise entrusted with placing advertising by the subject of the advertisement (e.g., advertising agency).

The advertisers 104 each include one or more advertiser computer systems 118a-118n (collectively 118, only two shown). The advertiser computer systems 118 may take any of a large variety of forms, including personal or microcomputers, including laptop and desktop computers, minicomputers, workstations, server computers, and even mainframe computers. The advertiser computer systems 118 are communicatively coupled to provide advertisement content (i.e., advertisement) and related information to the alternative content manager or portal 113. The related information may specify advertisement placement criteria, for example, length of advertisement, type of media or format, language, general population target demographics, specific individual target demographics. The advertiser computer systems 118 may be communicatively coupled to the alternative content manager or portal 113 via a private network (e.g., virtual private network) 110a, or alternatively via a public network infrastructure, for instance the Internet or Worldwide Web.

The content providers 106 may take a variety of forms, for example, radio stations or broadcasters 106a, television stations or broadcasters 106b, other terrestrial or satellite broadcasters or multicasters (not shown), Webcasters 106c, etc. The content providers 106 may, or may not, own the content that they provide. Many content providers 106 earn revenue by selling blocks of advertising time or impressions. Content providers 106 may, or may not, provide free public service announcements. Many content providers 106 would commercially benefit from a robust market for blocks of advertising time or impressions.

A radio broadcaster 106a will typically include a source of content, for example, a sound board 122a or similar device. The radio broadcaster 106a will typically include one or more transmitters 124a and antennas 126a to wirelessly transmit programming. Various types of transmitters 124a and antennas 126a may be suitable, for example, commercially available transmitters and antennas for amplitude modulated (AM) or frequency modulated (FM) or other forms of wireless communications. Typically, additional circuitry is present to filter and otherwise condition or process the signals. Radio broadcasters 106a often employ transponders or repeaters (neither shown) to extend the range or coverage of their service area.

Typically, the radio broadcaster 106a will have, or will employ another party's content provider content server computer system (not shown) which serves or Webcasts programming. Such allows distribution of programming outside the radio broadcaster's 106a service area or range.

A television broadcaster 106b may include one or more content provider computer systems 120b communicatively coupled to provide advertisement placement opportunities to one or more of the advertising networks 102. The content provider computer systems 120b may take any of a large variety of forms, including personal or microcomputers including laptop and desktop computers, minicomputers, workstations server computers, and even mainframe computers.

Television broadcaster 106b will typically include a source of content, which may be supplied via a video board 122b or similar device. The television broadcaster 106b will typically include one or more transmitters 124b and antennas 126b to wirelessly transmit programming. Various types of transmitters 124b and antennas 126b may be suitable, for example, commercially available transmitters 124b and antennas 126b for analog (e.g., NTSC standard) or digital (e.g., ATSC standard) broadcasts. Typically, additional circuitry is present to filter and otherwise condition or process the signals. Television broadcasters 106b often employ transponders or repeaters (neither shown) to extend the range or coverage of their service area.

Typically, the television broadcaster 106b will have, or will employ another party's, content provider content server (not shown) which serves or Webcasts programming. Such allows distribution of programming outside the television broadcaster's 106b service area or range.

A Webcaster 106n may include one or more content provider computer systems 120n communicatively coupled to provide advertisement placement opportunities to one or more of the advertising networks 102. The content provider computer systems 120n may take any of a large variety of forms, including personal or microcomputers, including laptop and desktop computers, minicomputers, workstations, server computers, and even mainframe computers.

Webcaster 106b will typically include a source of content, which may be supplied via a nontransitory computer- or processor-readable medium that stores one or more WebPages or other content 122n or similar device. Typically, the Webcaster 106b will have, or will employ another party's, content provider content server (not shown) which serves or Webcasts programming.

End users or content consumers 108 may employ any of a large variety of devices. For example, end users 108 may employ personal computers 132a such as desktop computers, laptop computers, netbooks or tablet computers. Also, for example, end users 108 may employ mobile devices 132b, such as smart phones, personal digital assistants. Also, for example, end users 108 may employ televisions 132c, for example Internet or Web enabled televisions.

As noted above the CDNs may take the form of various networks of server computer systems 133a, 133b-133n (collectively 133) and associated nontransitory storage media 135a, 135b-135n (collectively 135), typically geographically distributed to allow caching of content, including alternative content, and associated information. Such may be accessible by content consuming devices via a public network infrastructure, for instance the Internet or Worldwide Web 110b.

The alternative content manager and/or portal systems 113 serves as an exchange or clearing house to display advertisement placement opportunities and related information, to allow reserving, committing to, purchasing of or placement of advertisements including, for instance, bidding or offers on advertisement placement opportunities, and automating placement of advertisements as insertions into a flow or stream of content provided by the content providers 106. Such allows content providers 106 to display the availability of advertisement placement opportunities to place advertisements. Such also allows advertisers 104 to view advertisement placement opportunities, reserve, bid or make an offer on advertisement placement opportunities, or otherwise place advertisements in the advertisement placement opportunities. Such may also automatically cause insertion of advertisements in a flow or stream of content retrieved by content consumers 108 using a dynamically generated manifest provided by the alternative content selector and manifest generator subsystem 115. For example, placed advertisements may be inserted into a sequence of content as a substitute for, or in place of, advertisements or other material that was part of an original broadcast or Webcast of content by the content provider 106.

The alternative content manager and/or portal systems 113, or some other system, may distribute encoded content fragments to one or more CDNs 133. In particular, the alternative content manager and/or portal systems 113 may receive encoded content fragments, and distribute such for caching to selected CDNs, for example as illustrated by solid line single headed arrows extending between the alternative content manager and/or portal systems 113 and the CDNs 133. This may advantageously provide advertisers 104 and/r advertiser networks 102 with simple access to management of CDN 133 selection and distribution via a common or "central" Web-based portal. Notably, there may be one or more "central: Web-based portals, which may or may not be geographically distributed. Thus, the term "central" is not used to suggest a single portal, but rather a portal via which numerous CDNs 133 may be managed.

The alternative content manager and/or portal system 113 includes one or more alternative content manager and/or portal system server computer systems 112 (only one shown). The alternative content manager and/or portal system 113 includes one or more nontransitory computer- or processor-readable storage media which stores an advertisement content inventory 114 (only one shown). The alternative content manager and/or portal system 113 includes one or more nontransitory computer- or processor-readable storage media which stores an inventory of advertisement placement opportunities 116 (only one shown) to place advertisements in broadcasts and/or Webcasts for each of a plurality of broadcast and/or Webcast content providers 106 that transmit broadcasts and/or Webcasts. The alternative content manager and/or portal system server computer system 112 is communicatively coupled to the storage media which stores an advertisement content inventory 114 and/or to the storage media which stores an inventory of advertisement placement opportunities 116 and executes instructions that cause the advertiser network server computer systems 112 to store, retrieve and/or update the information in the advertisement content inventory 114 and/or advertisement placement opportunities inventory 116. The alternative content manager and/or portal system server computer system 112 is also coupled to communicate with the advertiser computer systems 118 and/or the advertiser network computer systems 119 via the one or more networks or other communications channels, for instance 113 via the private network (e.g., virtual private network) 110a, or alternatively via a public network infrastructure, for instance the Internet or Worldwide Web. The alternative content manager and/or portal system server computer system 112 is communicatively coupled to the fragment encoder systems 173 and optionally the alternative content inserter systems 171, for example via a private network infrastructure 110c.

The alternative content selector and manifest generator system 115 may include a selector subsystem 141 and a manifest generation subsystem 143. The selector subsystem 141 and the manifest generation subsystem 143 may be implemented as two distinct components, for instance two distinct hardware components as illustrated in FIG. 1. Thus, the selector subsystem 141 may include a selector computer system 145 and a selector nontransitory storage medium 147, and the manifest generator subsystem 141 may include a manifest generator computer system 149 and a manifest generation nontransitory storage medium 151. Alternatively, selector subsystem 141 and the manifest generation subsystem 143 may be implemented as a combined component, for example using a same computer system to perform both the selection and the manifest generation. The computer systems 145, 149 may take a variety of forms, for example a simple controller (e.g., DSP, microprocessor, programmable logic controller, ASIC, FPGA), with or with separate memory (e.g., ROM, RAM), to more complicated systems such a desktop, mini, server or mainframe computer systems. Likewise, the nontransitory storage medium 147, 151, may take a variety of forms, for example spinning media such as hard disks or optical disks and associated drives, or stationary media such as solid-state drives or FLASH memory.

The alternative content selector and manifest generator system 115, and particularly the selector subsystem 141, is communicatively coupled to the alternative content manager and/or portal system server computer system 112. The alternative content selector and manifest generator system 115 may be collocated with the alternative content manager and/or portal system server computer system 112, or located remotely therefrom. Thus, the communicative coupling therebetween can take any of a large variety of forms, include wired interfaces, wireless interfaces, serial or parallel interfaces, networked or non-networked interfaces.

The alternative content selector and manifest generator system 115, and particularly the manifest generator subsystem 143, is communicatively coupled to the fragment encoder systems 173 and the alternative content inserter systems 171, for example via the private network infrastructure 110c. In some implementations the manifest generator subsystem 143 is communicatively coupled to the alternative content inserter systems 171 in lieu of the fragment encoder systems 173. The alternative content selector and manifest generator system 115, and particularly the manifest generator subsystem 143, is communicatively coupled to the content consumers 108, for example via the public network infrastructure 110b.

The selector subsystem 141 selects alternative content for placing into a sequence or stream of content. In particular, the selector subsystem may select alternative content segments to insert into a sequence of content segments. The alternative content segments will typically be inserted as replacements for other content segments. While the alternative content may take a variety of forms, in at least one example the alternative content takes the form of alternative advertisement segments, which are to replace advertisements segments in the broadcast or Webcast provided by the broadcaster or Webcaster. As discussed in detail below, a length or duration of alternative content segments do not need to be the same as a length or duration of the content segments which the alternative content segments will replace. Thus, each alternative content segments may be longer or shorter than a respective content segment which the alternative content segment will replace. Additionally, in some instances multiple sequential alternative content segment may replace a single content segment, while in other instances a single alternative content segment may replace multiple sequential content segments.

The selector subsystem 141 may select alternative advertisement segments, or other alternative content, based on a variety of criteria.

For example, the selector subsystem 141 may select alternative advertisement segments, or other alternative content, which is determined, calculated or expected to produce a highest revenue for the content provider, for an advertiser, or for some other entity. For instance, the selector subsystem 141 may rely on information about content consumers 108 on an individual or more general audience basis and/or information regarding desired placement or audience attributes by advertisers 104 or advertiser networks 102.

Also for example, the selector subsystem 141 may select alternative advertisement segments, or other alternative content, which is targeted or deemed to be of more interest to an individual or audience that will receive the content with the alternative content. For instance, the selector subsystem 141 may rely on information about content consumers 108 on an individual or more general audience basis.

Information about the content consumers 108 on an individual or more general audience basis may include, for example, geographic information, such as a current approximate geographic location of a content consumer device 132 or a geographic location associated with a content consumer 108. Geographic information may be discerned through Internet protocol address, GPS or cellular locating systems, and/or via self reported information or registration. Information about the content consumers 108 on an individual or more general audience basis desired placement or audience attributes by advertisers 104 or advertiser networks 102 may include demographic information, for example age group or age, income level, gender, spoken language, and other demographic information, some of which is discussed further herein. Demographic information may be represented on a group basis and/or on an individual basis. Information about the individual or audience may additionally or alternatively include a browsing history or a buying history.

As a further example, the selector subsystem 141 may select alternative advertisement segments, or other alternative content, at least in part based on a duration or length of a segment which is to be replaced and/or a delay between presentation of content in an alternative stream thereof relative to the presentation of the content in a broadcast or Webcast from which the alternative stream was derived. For example, the selector subsystem 141 may select alternative advertisement segments to minimize any delay between presentation of content segments in an alternative stream thereof relative to the presentation of the same content segments in the broadcast or Webcast from which the alternative stream was derived. Such may be achieved while still not requiring an exact or even an approximate match between duration or length of replacement content segments and those content segments which are to be replaced.

Also for example, the selector subsystem 141 may select alternative advertisement segments based on a defined or discerned preference for length or duration of a content consumer 108. For instance, some content consumers 108 may demonstrate a preference for a smaller number of longer advertisements, while other content consumers 108 may demonstrate a preference for a larger number of short advertisements. Such preference may be discerned by querying the content consumer 108, or by tracking or monitoring the content consumer's behavior over a period of time, for example linger time relative to a Webpage or streaming media presentation. Such information may, for example, be stored in a cookie on the associated content consumer device 108.

Thus, the selector 141 may base the selection on a variety of factors or parameters. For example, the selector 141 may base the selection at least in part on a total amount of revenue generated by the inserted material, for instance, placed advertisements. For instance, the selector 141 may attempt to maximize the revenue generated by placements of advertising. Also for example, the selector 141 may base the selection at least in part on an appropriateness of the material to be inserted. For instance, the selector 141 may select the insertion material in part on an attempt to match a format, language, general demographic or specific demographic of the insertion material with that of an audience or target audience of the programming which will be streamed or otherwise delivered separately from the broadcast. This advantageously allows differences between audiences of broadcasts and Web based viewing or listening to be accommodated.

The manifest generator subsystem 143 dynamically generates manifests 161 (only one called out in FIG. 1) for requested content in response to requests 163 (only two called out in FIG. 1), with alternative or replacement content inserted therein. In particular, the manifest generator subsystem 143 dynamically generates manifests 161 that indicate where and/or how to retrieve or otherwise obtain content fragments 165 (only two called out in FIG. 1) of requested content along with the alternative content. The dynamically generated manifests 161 may indicate logical network addresses or other locations or pointers to where the content fragments 165 of various content segments are cached or otherwise stored. For instance, the dynamically generated manifests 161 may indicate various IP addresses for retrieving content fragments from one or more CDNs 109. The dynamically generated manifests 161 indicate an order for the presentation of the content fragments 165, which order may be the inherent order of the addresses or locations in the dynamically generated manifest 161, or which order may be explicitly set out in a list or array stored in the dynamically generated manifest 161.

The content fragments 165 may be wrapped in an encryption layer (e.g., thin encryption layer). Such may force the content fragments to go through the alternative content manager and/or portal systems 113, or some other system, to unwrap the encryption in the cloud prior to redistribution. Such may advantageously prevent use of encoders 173 directly by the content provider(s) 106 with the CDNs 133. Alternatively or additionally, in some implementations one or more of the encoders 173 may provide the content fragments 165 directly to one or more CDNs 133, for example as illustrated by broken line single headed arrow extending between encoder 173a and CDN 109a. Such may omit the encryption layer, or may employ an encryption layer specific to the particular CDN 109a.

The manifest generator subsystem 143 may dynamically generate the manifest 161 based on a variety of criteria. For example, the manifest generator subsystem 143 may dynamically generate the manifest 161 based on a least cost, shortest network distance and/or least latency analysis. Such may indicate the caching or use of cached content fragments at one location (e.g., a first CDN 109a) over another location (e.g., a second CDN 109b). Criteria may include a preference for certain delivery systems, such as certain CDNs 109. Such preference may be provided by an advertiser 104 and/or advertiser network 102 associated with the alternative content being inserted. Such a preference may be based on various criteria, for instance geographic location, redundancy, efficiency, or even financial cost.

Advantageously, the dynamically generated manifests 161 are dynamically generated based on selected alternative content, for instance alternative advertisements or alternative advertisement segments. Thus, the dynamically generated manifests 161 are tailored or customized for specific content consumers 108 or groups of content consumers 108, and/or for specific advertisers 104 or advertiser networks 102.

The manifest generator subsystem 143 may dynamically generate manifests based on information provided by the fragment encoder systems 173, provided by the alternative content inserters 171, or provided by both.

The fragment encoder system 173a and the alternative content inserter 171a may, for example, be located at the radio broadcaster 106a facilities. Alternatively, the fragment encoder system 173a and the alternative content inserter 171a may be located remotely from the radio broadcaster 106a facilities. Even though collocated, such may be owned, operated or otherwise controlled by a different entity that the radio broadcaster. The fragment encoder system 173a and the alternative content inserter 171a may be implemented as two distinct components, for instance two distinct hardware components. Alternatively, the fragment encoder system 173a and the content inserter 171a may be implemented as a single, integrated hardware component.

The alternative content inserter 171a is coupled to receive programming from the sound board 122a. The alternative content inserter 171a may also optionally be communicatively coupled to receive alternative audio material to be inserted or substituted in the programming, for example, placed alternative advertisements. For instance, the alternative content inserter 171a may be communicatively coupled to the alternative content manager and/or portal systems 113 to receive the alternative content, for example via the private network infrastructure 110c. Alternatively, the alternative content inserter 171a may be communicatively coupled to the alternative content manager and/or portal systems 113 to receive information indicative of a location from which the alternative content or fragments thereof may be retrieved.

A primary function of the alternative content inserter 171a is to detect content or content segments of replaceable content or material in the broadcast programming. Various implementations of such are discussed in detail below. An optional function of the alternative content inserter 171a is to insert or substitute alternative content or material in a stream or sequence or program of the content. For example, inserting alternative content segments in a sequence of defined segments or blocks of the programming material, for instance, in advertisement segments or blocks, in place of or as a substitute for advertisements in the broadcast programming. Such may, for example, allow replacement of material that is of local interest with material that is more appropriate for a wider audience or even more appropriate for a more specific audience, and/or replacement of material that generates lower revenue with material that generates higher revenue.

Where or when the alternative content inserter 171a does not insert or substitute replacement content into the programming, the manifest generator 143 may insert location information that indicates a location (e.g., logical network address) at which alternative content fragments may be retrieved.

As explained in more detail herein, the alternative content inserter 171a may use buffering to allow the replacement material to, in some instances, fit within a content segment or block, or in other instances, overlap or partially overlap the content segment or block. The alternative content inserter 171a may attempt to maintain the streaming of modified programming approximately concurrent with the radio broadcast, reducing delay or lag therebetween. The alternative content inserter 171a provides the programming, with the inserted alternative material, to the fragment encoder system 173a.

The fragment encoder system 173a encodes content, including original content from the broadcast or Webcast into fragments 165 suitable for storage, retrieval and playing on content consumer devices 132. Where the alternative content inserter 171a is employed to insert or substitute replacement material, the fragment encoder system 173a encodes the replacement content as well as into the fragments 165. Where the alternative content inserter 171a is not employed, some other system or component (e.g., alternative content manager and/or portal systems 113, selector subsystem 141) may encode the replacement content into fragments 165.

The fragment encoder system 173a, or some other system (e.g., alternative content manager and/or portal systems 113, selector subsystem 141) may transmit the encoded content fragments 165 to various network locations for storage. For example, the fragment encoder system 173a may transmit the encoded content fragments 165 to various CDNs 109 for storage, for instance via the private network infrastructure 110c. Such allows content consumer devices 132 to retrieve the encoded content fragments 165 according to a dynamically generated manifest 161 via a public network infrastructure 110b such as the Worldwide Web portion of the Internet.

Similarly, the fragment encoder system 173b and the alternative content inserter 171b may, for example, be located at the television broadcaster 106b facilities. Alternatively, the fragment encoder system 173b and the alternative content inserter 171b may be located remotely from the television broadcaster 106b facilities. Even though collocated, such may be owned, operated or otherwise controlled by a different entity that the television broadcaster. The fragment encoder system 173b and the alternative content inserter 171b may be implemented as two distinct components, for instance two distinct hardware components. Alternatively, the fragment encoder system 173b and the alternative content inserter 171b may be implemented as a single, integrated hardware component.

The alternative content inserter 171b is coupled to receive programming from the video board 122b. The alternative content inserter 171b may also be communicatively coupled to receive alternative video material to be inserted or substituted in the programming, for example, placed advertisements. For instance, the alternative content inserter 171b may be communicatively coupled to the alternative content manager and/or portal systems 113 to receive the alternative content, for example via the private network infrastructure 110c. Alternatively, the alternative content inserter 171b may be communicatively coupled to the alternative content manager and/or portal systems 113 to receive information indicative of a location from which the alternative content or fragments thereof may be retrieved.

A primary function of the alternative content inserter 171b is to detect content or content segments of replaceable content or material in the broadcast programming. Various implementations of such are discussed in detail below. An optional function of the alternative content inserter 171b is to insert or substitute alternative content or material in a stream or sequence or program of the content. For example, inserting alternative content segments in a sequence of defined segments or blocks of the programming material, for instance, in advertisement segments or blocks, in place of or as a substitute for advertisements in the broadcast programming. Such may, for example, allow replacement of material that is of local interest with material that is more appropriate for a wider audience or even more appropriate for a more specific audience, and/or replacement of material that generates lower revenue with material that generates higher revenue.

Where or when the alternative content inserter 171b does not insert or substitute replacement content into the programming, the manifest generator 143 may insert location information that indicates a location (e.g., logical network address) at which alternative content fragments may be retrieved.

As explained in more detail herein, the alternative content inserter 171b may use buffering to allow the replacement material to, in some instances, fit within a content segment or block, or in other instances overlap or partially overlap the content segment or block. The alternative content inserter 171b may attempt to maintain the streaming of modified programming approximately concurrent with the radio broadcast, reducing delay or lag therebetween. The alternative content inserter 171b provides the programming, with the inserted alternate material, to fragment encoder subsystem or component 173b.

The fragment encoder system 173b encodes content, including original content from the broadcast or Webcast, into fragments 165 suitable for storage, retrieval and playing on content consumer devices 132. Where the alternative content inserter 171b is employed to insert or substitute replacement material, the fragment encoder system 173b encodes the replacement content as well as into the fragments 165. Where the alternative content inserter 171b is not employed, some other system or component (e.g., alternative content manager and/or portal systems 113, selector subsystem 141) may encode the replacement content into fragments 165.

The fragment encoder system 173b, or some other system (e.g., alternative content manager and/or portal systems 113, selector subsystem 141) may transmit the encoded content fragments 165 to various network locations for storage. For example, the fragment encoder system 173b may transmit the encoded content fragments 165 to various CDNs 109 for storage, for instance via the private network infrastructure 110c. Such allows content consumer devices 132 to retrieve the encoded content fragments 165 according to a dynamically generated manifest 161 via a public network infrastructure 110b such as the Worldwide Web portion of the Internet.

Similarly, fragment encoder system 173n and the alternative content inserter 171n may, for example, be located at the Webcaster 106n facilities. Alternatively, the fragment encoder system 173n and optionally the alternative content inserter 171n may be located remotely from the Webcaster 106*n* facilities. Even though collocated, such may be owned, operated or otherwise controlled by a different entity that the Webcaster. The fragment encoder system 173*n* and the alternative content inserter 171*n* may be implemented as two distinct components, for instance two distinct hardware components. Alternatively, the fragment encoder system 173*n* and the alternative content inserter 171*n* may be implemented as a single, integrated hardware component.

The alternative content inserter 171*n* is coupled to receive content from the store of one or more WebPages or other content 122*n*. The alternative content inserter 171*n* may also optionally be communicatively coupled to receive alternative content material to be inserted in the programming, for example, placed alternative advertisements. For instance, the alternative content inserter 171*n* may be communicatively coupled to the alternative content manager and/or portal systems 113 to receive the alternative content, for example via the private network infrastructure 110*c*. Alternatively, the alternative content inserter 171*n* may be communicatively coupled to the alternative content manager and/or portal systems 113 to receive information indicative of a location from which the alternative content or fragments thereof may be retrieved.

A primary function of the alternative content inserter 171*n* is to detect content or content segments of replaceable content or material in the broadcast programming. Various implementations of such are discussed in detail below. An optional function of the alternative content inserter 171*n* is to insert or substitute alternative content or material in a stream or sequence or program of the content. For example, inserting alternative content segments in a sequence of defined segments or blocks of the programming material, for instance, in advertisement segments or blocks, in place of or as a substitute for advertisements in the broadcast programming. Such may, for example, allow replacement of material that is of local interest with material that is more appropriate for a wider audience or even more appropriate for a more specific audience, and/or replacement of material that generates lower revenue with material that generates higher revenue.

The alternative content or material to be inserted may, for example, take the form of placed advertisements (e.g., preroll advertisements which appear before a video or FLASH® player clip, banner advertisements).

Where or when the alternative content inserter 171*n* does not insert or substitute replacement content into the programming, the manifest generator 143 may insert location information that indicates a location (e.g., logical network address) at which alternative content fragments may be retrieved.

As explained in more detail herein, the alternative content inserter 171*n* may use buffering to allow the replacement material to, in some instances, fit within a content segment or block, or in other instances, overlap or partially overlap the content segment or block. The alternative content inserter 171*n* provides the programming, with the inserted alternative material, to fragment encoder subsystem or component 173*n*.

The fragment encoder system 173*n* encodes content, including original content from the broadcast or Webcast into fragments 165 suitable for storage, retrieval and playing on content consumer devices 132. Where the alternative content inserter 171*n* is employed to insert or substitute replacement material, the fragment encoder system 173*n* encodes the replacement content as well as into the fragments 165. Where the alternative content inserter 171*n* is not employed, some other system or component (e.g., alternative content manager and/or portal systems 113, selector subsystem 141) may encode the replacement content into fragments 165.

The fragment encoder system 173*n*, or some other system (e.g., alternative content manager and/or portal systems 113, selector subsystem 141) may transmit the encoded content fragments 165 to various network locations for storage. For example, the fragment encoder system 173*n* may transmit the encoded content fragments 165 to various CDNs 109 for storage, for instance via the private network infrastructure 110*c*. Such allows content consumer devices 132 to retrieve the encoded content fragments 165 according to a dynamically generated manifest 161 via a public network infrastructure 110*b* such as the Worldwide Web portion of the Internet.

Networked Environment Detailed View of Particular Components

Figure 2:
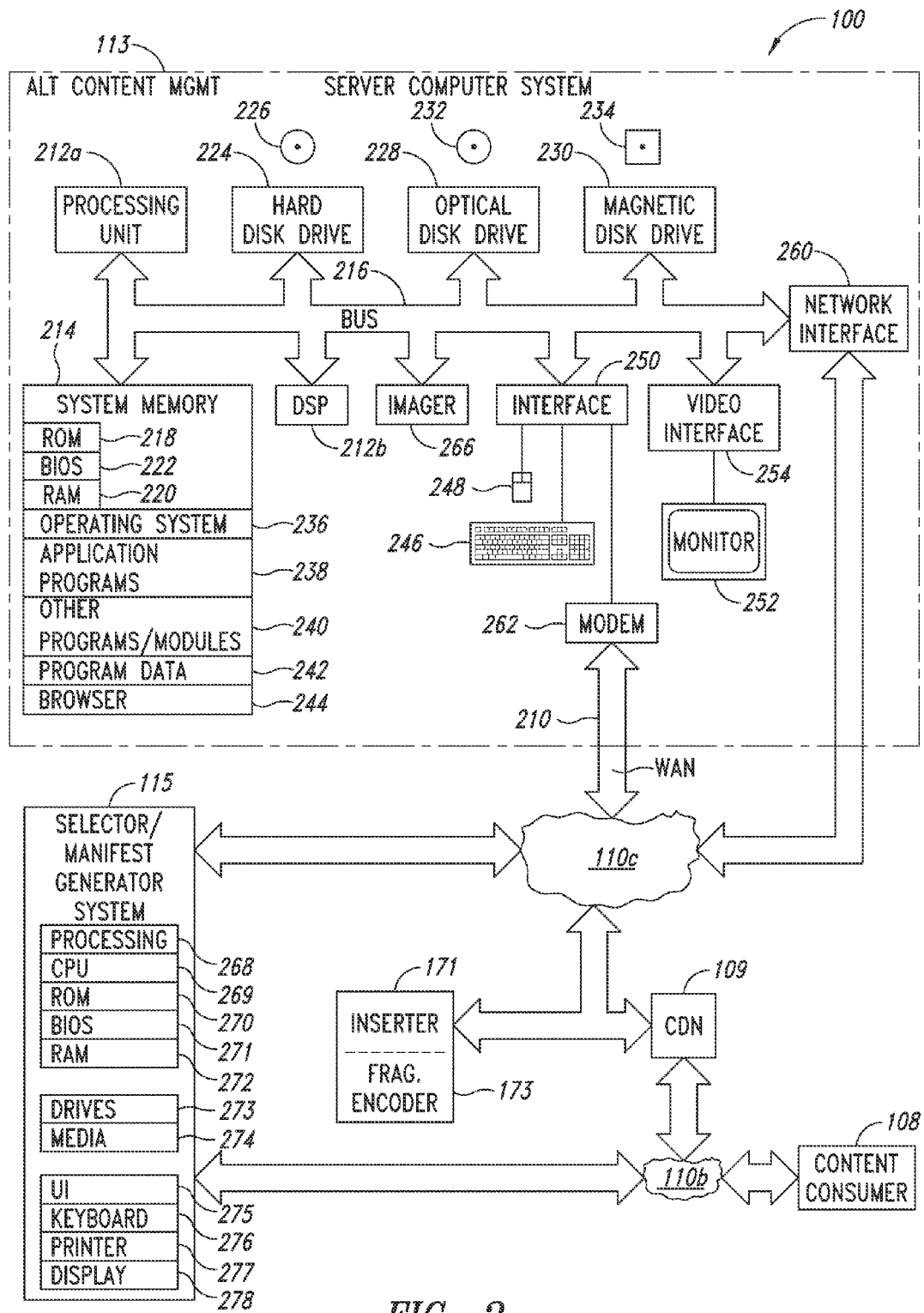
FIG. 2 is a schematic diagram of portions of the networked environment of FIG. 1, showing certain components thereof in more detail, according to one illustrated embodiment.

FIG. 2 shows a portion of the networked environment 100 comprising an alternative content manager and/or portal system 113, an alternative content selector and manifest generator system 115, an alternative content inserter 171 and fragment encoder system 173, a CDN 109 and a content consumer 108, communicatively coupled by one or more communications channels, for example, one or more networks 110*b*, 110*c*, according to one illustrated embodiment. FIG. 2 provides a more detailed representation of some of the elements of FIG. 1.

The advertising network server computer system 112 will at times be referred to in the singular herein, but this is not intended to limit the embodiments to a single device or system since in typical embodiments, there may be more than one alternative content manager and/or portal system 113 involved. Unless described otherwise, the construction and operation of the various blocks shown in FIG. 2 are of conventional design. As a result, such blocks need not be described in further detail herein, as they will be understood by those skilled in the relevant art.

The alternative content manager and/or portal system 113 may include one or more processing units 212*a*, 212*b* (collectively 212), a system memory 214 and a system bus 216 that couples various system components including the system memory 214 to the processing units 212. The processing units 212 may be any logic processing unit, such as one or more central processing units (CPUs) 212*a*, digital signal processors (DSPs) 212*b*, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the advertising network server computer system 112, such as during start-up.

The alternative content manager and/or portal system 113 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD/DVD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program engines and other data for the alternative content manager and/or portal system 113. Although the depicted alternative content manager and/or portal system 113 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. The hard disk 226 may, for example, store advertising content inventory and related information and/or advertising placement opportunity inventory and related information.

Program engines can be stored in the system memory 214, such as an operating system 236, one or more application programs 238, other programs or engines 240 and program data 242. Application programs 238 may include instructions that cause the processor(s) 212 to automatically store, update, present, offer advertisement placement opportunities and related information to potential advertisers or their representatives. Application programs 238 may include instructions that cause the processor(s) 212 to automatically store and update material intended for insertion into flows or streams of information, for example, advertisements or advertising content and related information. Application programs 238 may include instructions that cause the processor(s) 212 to automatically store and update material related to various criteria related to the alternative content and/or desired audiences for such content, and revenue or compensation schema related to such. Such information may specific geographic location or demographics to which the alternative content should be directed, or preferences for particular CDNs to be used in delivering content.

For example the instructions and data stored in non-transitory computer-readable storage media may that cause the processor(s) to provide information specifying the availability of various advertisement placement opportunities to the advertising server computer system 118 (FIG. 1) and/or advertising network server computer system 119 (FIG. 1), along with supporting information such as media type (e.g., radio, television, Web video) information or format (e.g., adult contemporary, pop, classic rock, classical, jazz, talk, sports) information, language of broadcast (e.g., English, Spanish), day, time, duration of advertisement placement opportunities, information specifying particular content or programming temporally or spatially proximate the advertisement placement opportunities, general demographic information regarding the content provider's audience, specific demographic information about specific members of the content provider's audience. The instructions also allow receipt of information regarding reservation, purchase, acceptance of advertisement placement opportunities or placement of advertisements.

Other program engines 240 may include instructions for handling security such as password or other access protection and communications encryption. The system memory 214 may also include communications programs, for example, a server 244 for permitting the alternative content manager and/or portal system 113 to provide services and exchange data with other computer systems or devices via the Internet, corporate intranets, extranets, or other networks (e.g., LANs, WANs) as described below, as well as other server applications on server computing systems such as those discussed further herein. The server 244 in the depicted embodiment may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers are commercially available such as those from Microsoft, Oracle, IBM and Apple.

While shown in FIG. 2 as being stored in the system memory 214, the operating system 236, application programs 238, other programs/engines 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the alternative content manager and/or portal system 113 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The alternative content manager and/or portal system 113 can include other output devices, such as speakers, printers, etc.

The alternative content manager and/or portal system 113 can operate in a networked environment using logical connections to one or more remote computers and/or devices as described above with reference to FIG. 1. For example, the alternative content manager and/or portal system 113 can operate in a networked environment using logical connections to one or more advertiser computer systems 118 (FIG. 1) and/or one or more advertiser network computer systems 119 (FIG. 1), an alternative content selector and manifest generator system 115, and/or optional alternative content inserter 171 and/or fragment encoder system 173. Communications may be via a wired and/or wireless network architecture, for instance, wired and wireless enterprise-wide computer networks, intranets, extranets, and the Internet. Other embodiments may include other types of communication networks including telecommunications networks, cellular networks, paging networks, and other mobile networks.

The alternative content selector and manifest generator system 115 may take the form of a conventional mainframe computer, mini-computer, workstation computer, personal computer (desktop or laptop), or handheld computer. The alternative content selector and manifest generator system 115 may include a processing unit 268, a system memory 269 and a system bus (not shown) that couples various system components including the system memory 269 to the processing unit 268. The alternative content selector and manifest generator system 115 will at times be referred to in the singular herein, but this is not intended to limit the embodiments to a single alternative content selector and manifest generator system 115 since in typical embodiments, there may be more than one alternative content selector and manifest generator system 115 or other device involved. Non-limiting examples of commercially available computer systems include, but are not limited to, an 80×86, Pentium, or i7 series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the alternative content selector and manifest generator system 115 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the sending client computer system 114a, such as during start-up.

The alternative content selector and manifest generator system 115 may also include one or more media drives 273 (e.g., a hard disk drive, magnetic disk drive, and/or optical disk drive) for reading from and writing to computer-readable storage media 274 (e.g., hard disk, optical disks, and/or magnetic disks). The computer-readable storage media 274 may, for example, take the form of removable media. For example, hard disks may take the form of a Winchester drives, optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program engines and other data for the alternative content selector and manifest generator system 115. Although described as employing computer-readable storage media 274 such as hard disks, optical disks and magnetic disks, those skilled in the relevant art will appreciate that alternative content selector and manifest generator system 115 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, data from human resource management programs or tools, third party tracking programs or tools, etc., can be stored in the computer-readable storage media 274.

Program engines, such as an operating system, one or more application programs, other programs or engines and program data, can be stored in the system memory 269. Program engines may include instructions to select alternative or replacement content to replace content identified as replaceable in metadata associated with the content. In particular, the instructions may cause selection of alternative or replacement content based on a variety of criteria including a current geographic location or approximate current geographical location of a content consumer device 132 (FIG. 1), a geographic location or approximate geographical location associated with a content consumer 108, demographic information associated with the content consumer 108, length or duration of content to be replaced or difference or amount of lag between an alternative presentation of content relative to a broadcast or Webcast of the original, unaltered content or programming, revenue generation and/or maximization of revenue generation.

Program engines may include instructions for handling security such as password or other access protection and communications encryption. The system memory 269 may also include communications programs, for example, a Web client or browser that permits the alternative content selector and manifest generator system 115 to access and exchange data with sources such as Web sites of the Internet, corporate intranets, extranets, or other networks as described below, as well as other server applications on server computing systems such as those discussed further below. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/engines, program data and/or browser can be stored on the computer-readable storage media 274 of the media drive(s) 273. An operator can enter commands and information into the sending client computer system 114a via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The alternative content selector and manifest generator system 115 can include other output devices, such as speakers, printers, etc.

Alternative Content Inserter and Fragment Encoder

Figure 3:
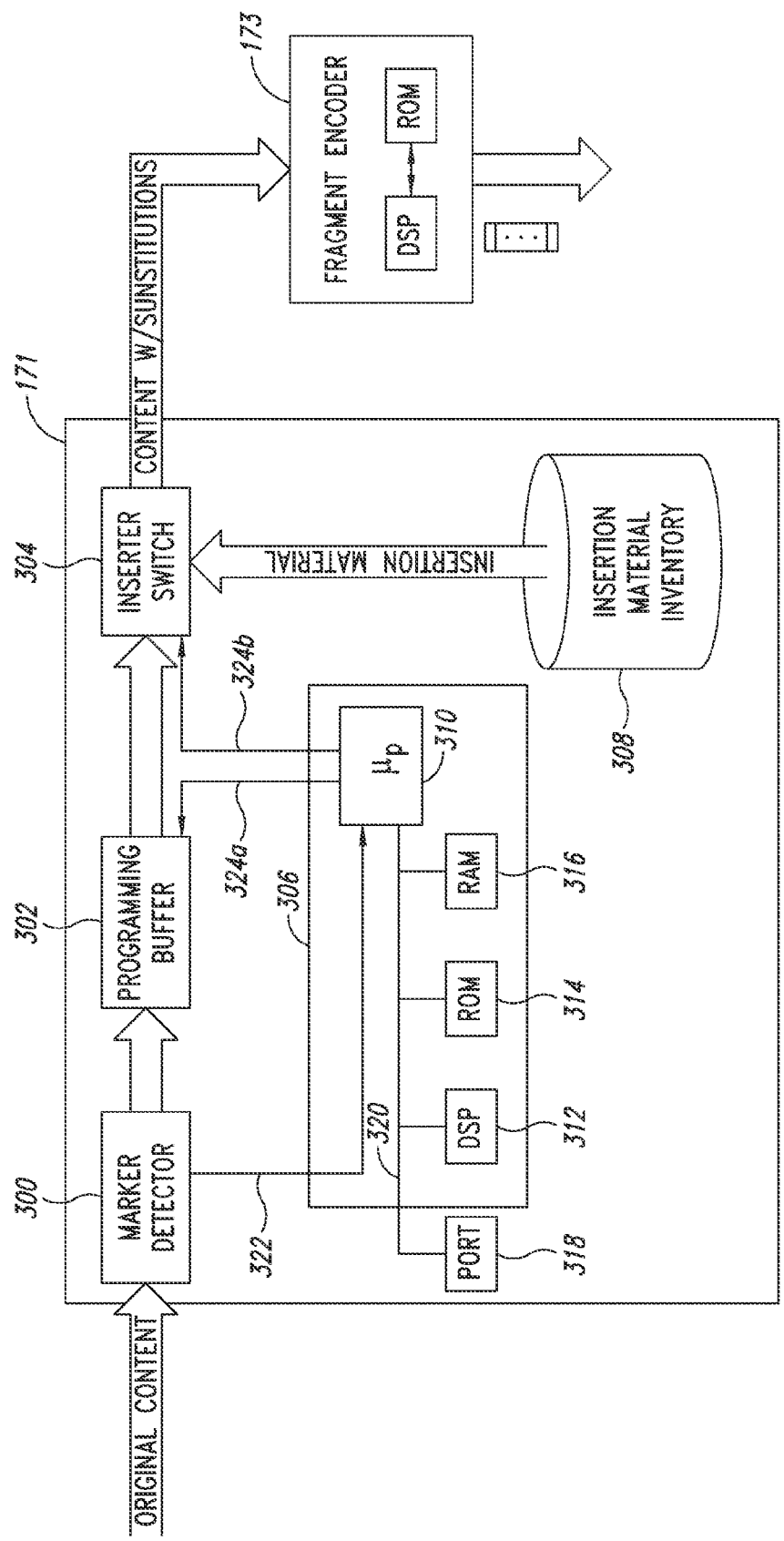
FIG. 3 is a schematic diagram of an inserter and a fragment encoder coupled to detect replaceable content in programming such as a terrestrial broadcast or Webcast, optionally insert or substitute alternative content for replaceable content and encode at least non-replaceable content of the programming as content or media fragments, according to one illustrated embodiment.

FIG. 3 shows an alternative content inserter 171 and fragment encoder system 173, according to one illustrated embodiment.

The alternative content inserter 171 includes a marker detector 300, and optionally includes a programming buffer 302, an inserter 171, a control subsystem 306, a nontransitory computer- or processor-readable medium that stores material to be inserted into programming (i.e., insertion material inventory 308). The alternative content inserter 171 is communicatively coupled to receive original programming from a content provider system, for instance, a sound board 122a (FIG. 1), video board 122b (FIG. 1), collection of content such as WebPages 122n (FIG. 1) any other source of content. The alternative content inserter 171 is optionally also communicatively coupled, for example via a port 318, to receive alternative or replacement content from a source such as an alternative content manager and/or portal systems 113, or to receive information that specifies a location or link to retrieve alternative or replacement content from a source such as an alternative content selector and manifest generator system 115.

As noted above, a primary function of the alternative content inserter 171 is to detect content or content segments of replaceable content or material in the broadcast programming to trigger an action. Such, for example, triggers the replacement of replaceable content segments with replacement content segments for encoding by the fragment encoder 173. Alternatively, such triggers the use of location information for content fragments encoding replacement content segments in generating a manifest by the manifest generator 143 in place of location information for content fragments encoding the replaceable content segments.

In some implementations, the marker detector 300 detects transitions in programming. The marker detector 300 may, for example, detect the start and/or end of advertisement blocks or segments in the programming. The marker detector 300 may, for example, detect the start and/or end of content, for instance, non-advertising content in the programming. Many types of programming includes indicators or markers that mark the start and/or end of certain segments, for instance, marking the start or end of a block of advertisements and/or the start or end of the non-advertisement content. In some instances, the indicators or markers are simply mark the occurrence of the start or end of a segment. In other instances, these indicators or markers include information about the respective segment. For example, a start indicator or marker may include information that specifies a duration of the segment. The indicators or markers may additionally, or alternatively include other information. The marker detector 300 scans the programming signal for these indicators or markers and produces signals in response to detection of the same. The marker detector 300 may also extract any information included in, or with, the indicator marker, for instance, an indication of a duration of the segment.

The programming buffer 302 is downstream from the marker detector 300 and may optionally buffer programming when necessary or desirable. For example, such may allow time shifting of programming material, which may increase flexibility of the alternative content inserter 171. For example, where a duration of replacement material matches a duration of material being replaced, the amount of material cached by the programming buffer 302 may remain constant or not change. Where a duration of replacement material exceeds a duration of material being replaced, the amount of material cached by the programming buffer 302 may grow or increase. Where a duration of replacement material is less than a duration of material being replaced, the amount of material cached may shrink or be reduced. Such may advantageously allow selection of material for insertion having durations that do not exactly match the durations of the segments in which the material will be inserted. For example, a number of advertisements to be inserted into an advertising block or segment may have a combined duration that is greater or less than a duration of the advertising block or segment.

The alternative content inserter 171 may be configured or programmed to reduce, over time, differences in timing between a broadcast of the programming and a streaming of the programming with the insertion. Thus, in some instances a segment of a broadcast of particular programming may appear slightly earlier in time than an appearance of the same segment in a streaming of the programming. Over time, that difference may be reduced, or even reverse with a subsequent segment in the streaming appearing slightly before the same subsequently segment appears in the broadcast of the programming. Such may be accomplished using the programming buffer 302 and via selection of insertion material that trends over time to reduce the differences in timing between the broadcast and the streaming. Thus, where the broadcast is ahead of the streaming, selection of replacement material of a shorter duration than material to be replaced will tend to reduce the difference. Where the broadcast is behind the streaming, selection of replacement material of a longer duration than material to be replaced will tend to reduce the difference. Various nontransitory processor- or computer-readable media may be employed as the programming buffer 302.

An inserter switch or mixer component 304 is coupled downstream of the programming buffer 302. The inserter switch or mixer component 304 selectively inserts alternative material to be inserted into the programming. For example, the inserter switch or mixer component 304 may insert material from the insertion material inventory 308 into particular segments of the programming. The material being inserted may, for example, replace other material. For instance, advertisements (e.g., commercial advertisements or commercials) appearing in programming that is broadcast by the content provider may be replaced with other advertisements. In some instances, the material to be inserted may be more appropriate for an audience or target audience that receives programming via the Worldwide Web as compared to an audience or target audience that receives programming via radio or television broadcasts. The inserter switch or mixer component 304 can take a variety of forms, as simply as a switch that selectively couples a downstream component or output of the alternative content inserter 171 alternative between a first input (e.g., programming buffer 302) that carries the programming (e.g., broadcast, Webcast) and a second input (e.g., insertion material inventory 308) that carries the alternative content or the material to be inserted.

The alternative content inserter 171 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement material does not need to be exactly the same length or duration as the material being replaced. Additionally, or alternatively, the alternative content inserter 171 may in some respects be similar or identical in structure and/or operation to that described in U.S. patent application publication No. 2007/0074243. Additionally, or alternatively, the alternative content inserter 171 may in some respects be similar or identical in structure and/or operation to that described in U.S. Pat. No. 6,577,716.

The control subsystem 306 may take a variety of forms. Typically, the control subsystem 306 will include one or more controllers, for example, microprocessors 310, DSPs 312, ASICs, PGAs, microcontrollers or the like. The control subsystem 306 will also typically include one or more nontransitory nonvolatile memories such as ROM or FLASH memory 314 and/or one or more volatile memories such as RAM 316. The control subsystem 306 may also include one or more communications ports 318, for example, parallel communications ports (e.g., Ethernet port) or serial communications ports (e.g., Universal Serial Bus ports). The communications ports 318 may allow wired and/or wireless communications with the alternative content inserter 171. The various components of the control subsystem 306 may be coupled via one or more buses 320 (only one shown), for example, one or more power buses, communications buses, instruction buses, address buses, data buses, etc.

The control subsystem 306 is configured or programmed to control the operation of the alternative content inserter 171. The control subsystem 306 is communicatively coupled to receive signals from the marker detector 300 via line 322. The signals may be indicative of the start, end and/or duration of a segment in the programming. The signals may also be indicative of other information, for instance, the type of segment, content of the segment, format of the segment or language of the segment. The control subsystem 306 uses the information received from the marker detector to determine when a segment of replaceable content occurs, which allows replacement of content either directly by the inserter switch 304 or indirectly by the manifest generator 143. For example, the control subsystem 306 may determine to insert advertising material at the start of an advertising segment or block of the programming. The insertion material may, for example, be replacement material, for instance, to replace less appropriate or less targeted material with more appropriate or more targeted material.

The control subsystem 306 may determine a length or duration of the advertising segment or block of the programming. The insertion material may be selected, for example via the selector 141, based in part on the determined length or duration of advertising segment or block of the programming. As described above, the selector 141 may not attempt to exactly match the length or duration of advertising segment or block of the programming, but rather may select insertion material of somewhat longer or shorter durations. In doing so, the selector 141 may rely, for example on the alternative content inserter 171 to buffer material, or rely on the manifest generator 143 to generate manifests to accommodate the differences in duration.

As a further example, the control subsystem 306 at least in part to match, to some degree, may select the insertion material at least in part to match, to some degree, the duration or length of material to be inserted with the duration or length of the segment. As previously explained buffering or caching allows inexact matching of duration or length. The control subsystem 306 may at least in part base selection the insertion material to reduce a lead or lag of the streamed programming with respect to the broadcasted programming. Thus, the control subsystem 306 may select material for insertion that is longer than the segment provided for insertion where the streamed programming lags the broadcasted programming. Alternatively, the control subsystem 306 may select material for insertion that is shorter than the segment provided for insertion where the streamed programming leads the broadcasted programming.

The control subsystem 306 provides control signals via control line 324a to the programming buffer 302 to control the buffering or caching of material into the programming. Optionally, the control subsystem 306 provides control signals via control line 324b to the inserter 304 to control the insertion or substitution of material into the programming. The control signals may cause the programming buffer or cache 302 to retain or collect programming while the inserter is still inserting alternative or replacement material.

The control subsystem 306 may be responsive at least in part to alternative content manager and/or portal systems 113 (FIG. 1) and/or selector 141. For example, the material for the insertion material inventory 308 may be provided via the alternative content manager and/or portal systems 113. Additionally, or alternatively, the alternative content manager and/or portal systems 113 or selector 141 may indicate which advertisements to insert into which advertisement placement opportunities. Such may be performed, for example, based on demographic information regarding the audience, demographic information regarding the target audience for the advertisement, and/or maximize advertising revenue generated by the advertisement insertions.

In one or more implementations, one or more fragment encoders may be positioned upstream of the marker detector. Such may be particularly useful where the alternative or replacement content is pre-encoded (i.e., prior to insertion). Thus, the fragment encoder encodes the content segments of the original programming (e.g., terrestrial broadcast or Webcast). The pre-encoded alternative or replacement content segments may then be combined with the encoded content segments of the original programming, responsive to the marker detector.

There are a number of possible approaches to marking fragments of content or media, each with possible advantages and disadvantages with respect to one another. Four such approaches are described below to provide examples, although other approaches may be employed.

Standard Stream Metadata

A first approach is denominated as a standard stream metadata approach, described immediately below.

A triggering system or component (e.g., mark detector 300) on the broadcast end identifies when the media stream or programming (e.g., terrestrial broadcast programming) is within a period that may have replaceable content (e.g., local advertisement).

In response to detection of a replaceable content segment, the fragment encoder 173 generates custom metadata in-stream that will inform the metadata generator 143 which content or media fragments may be replaced. This may be implemented via a singular start marker, an end marker, a pair of start and end markers, or a marker per packet.

The manifest generator 143 receives the metadata, and determines its proper state. The manifest generator 431 accordingly dynamically generates manifests based at least in part on the states over time.

Possible advantages to this approach may include that a client-side implementation could utilize the same triggers. This approach may seamlessly employ known protocols. This approach may allow use existing "off-the-shelf" encoders. This approach may also be able to operate with non-fragmented digital media received as input. For example, approach may also be able to operate with media received as H264 formatted media, wrapped in Real Time Messaging Protocol (RTMP), which was encoded by industry standard digital media encoders.

Possible disadvantages to this approach may include possible mutilation of display of metadata for players without specific code to handle metadata resulting from this approach, or alternatively without server-side reformatting the metadata. Also, use of individual single-shot start and end markers would require the manifest generator to be more sophisticated to account for the situation where listeners join in during (i.e., between start and finish) of a segment of replaceable content. Also, depending on the specific implementation, the manifest generator may need to account for media transport layer protocols.

Hint Sub-Streams/Sub-Channels

A second approach is denominated as a hint sub-stream/sub-channels approach, described immediately below.

A triggering system or component (e.g., mark detector 300) on the broadcast end identifies when the media stream or programming (e.g., terrestrial broadcast programming) is within a period that may have replaceable content (e.g., local advertisement).

In response, the fragment encoder 173 manages and outputs a separate sub-stream/sub-channel marker/timing information track to be streamed with the primary content.

The manifest generator 431 receives the extra stream channel and determines its proper state. The manifest generator 431 accordingly dynamically generates manifests based at least in part on the states over time.

Possible advantages to this approach may include that a client-side implementation could utilize the same triggers. This approach may seamlessly employ known protocols. This approach may allow use existing "off-the-shelf" encoders.

Possible disadvantages to this approach may include that the manifest generator instantly becomes transport container specific. This approach may also require manifest side logic to be able to read media transport and possibly codec level information, increasing the complexity of the manifest generator 143.

Mirrored Property File/Media Fragment

A third approach is denominated as a mirrored property file/media fragment approach, described immediately below.

A triggering system or component (e.g., mark detector 300) on the broadcast end identifies when the media stream or programming (e.g., terrestrial broadcast programming) is within a period that may have replaceable content (e.g., local advertisement).

In response, the fragment encoder 173 manages and outputs an accompanying xml file, which may be labeled or identified with the same identifier as an identifier used to identify the currently outputting content or media fragment. This way, each content or media fragment will always have a property file that contains all relevant information about the content or media fragment. The fragment encoder 173 may instead, or in addition, post this data. For example, the fragment encoder 173 post this data via Hypertext Transfer Protocol (HTTP) to the alternative content manager and/or portal systems 113.

The manifest generator 143 uses each associated property file to determine its state. The manifest generator 143 accordingly dynamically generates manifests based at least in part on the states over time.

Possible advantages to this approach may include that this approach is particularly simple and easy. This approach may also provide a substantial amount of potential for information storage. Also, the property files would be cacheable. This may thus provide a solution to the aforementioned "mid-join" problem without unduly complicating manifest generator 143 logic.

Possible disadvantages to this approach may include double the typical file output of other approaches that employ fragmented solutions. This approach also requires customized encoders. Further, if a property file is lost, information is lost.

Fragment Filename Property Storage

A fourth approach is denominated as a fragment file name property approach, described immediately below.

A triggering system or component (e.g., mark detector 300) on the broadcast end identifies when the media stream or programming (e.g., terrestrial broadcast programming) is within a period that may have replaceable content (e.g., local advertisement).

In response, the fragment encoder 173 changes a filename of each fragment to reflect the properties of the fragment. The properties contained or encoded in the filename would be limited by filename rules of the particular file system that is used.

The manifest generator 143 uses the filename of the inbound fragments to determine its state. The manifest generator 143 accordingly dynamically generates manifests based at least in part on the states over time.

Possible advantages to this approach may include that this approach is particularly simple and easy. Fragments and properties of fragments are transmitted with almost zero overhead, and at the exact same time. Properties of the media fragment become inherent of the file itself, preventing loss. Also, this approach is potentially usable in a client-side implementation, if replacement media conformed to the same filename specifications. This approach may also provide a solution to the aforementioned "mid-join" problem without unduly complicating manifest generator 143 logic.

Possible disadvantages to this approach may include a limited potential for information storage.

Data, Data Structures, and Nontransitory Storage Media

Various nontransitory media discussed above may store information such as data in one or more data structures. Data structures may take a variety of forms, for example records associated with relational databases, a database itself, lookup tables, etc. The data structures may store a variety of different information or data.

A data structure may store advertisement related information in the form of a record with a variety of fields.

The data structure may store an advertisement identifier that uniquely identifies an advertisement. The data structure may store a medium identifier that identifies a type of medium in which the advertisement may run. The medium identifier may, for example, specify one or more of radio, television, Web, etc. mediums. The data structure may store a duration indication that specifies a duration of the associated advertisement. The data structure may store an advertiser identifier that uniquely identifies an advertiser to which the advertisement related or is owned. The data structure may store a markets identifier that identifies one or more geographic markets (e.g., NYC, Pacific Northwest, Seattle) or other markets (e.g., high technology, industrial supply) to which the advertisement is targeted. The data structure may store a language identifier that identifies a language (e.g., English, Spanish) of the advertisement.

The data structure may store general population demographic information that specifies the demographics of the audience(s) to which the advertisement is targeted. The general population demographic information may include a large variety of information, for example, gender(s) (e.g., male, female, both), age(s) (e.g., 21-30 year olds), incomes (e.g., over $50,000 per year). Other or different generalized population demographic information may be employed.

The data structure may store specific demographic information that specifies the demographics of specific audience(s) or individual members of an audience to which the advertisement is targeted. Such may be useful where information for particular individuals in an audience have been collected, for instance, automatically collected or collected via self-reporting by those individuals. The specific demographic information may include a large variety of information. The specific demographic information may, for example, indicate a current location of an individual. The current location may be a fairly specific geographic location, which may be discernible, for example, from an Internet address, telephone area code and prefix, or from cellular location information. The current location may represent a type of location, for example, fixed or mobile, which may, for instance, be discerned from an Internet address or device type (e.g., Smartphone operating on cellular system versus operating on WI-FI, satellite radio, DSL line). The specific demographic information may, for example, indicate a device type employed by an individual. For instance, the device type may indicate a general device type (e.g., computer, tablet, Smartphone), or a more specific device type (e.g., manufacturer and model). Such may be determined, for example, by querying the device. The specific demographic information may, for example, indicate a bandwidth or service level available to an individual. Available bandwidth or service level may be discernible from the type of communications infrastructure involved, (e.g., cellular, WI-FI, DSL, cable modem) and/or device type.

The specific demographic information may, for example, include self reported demographic information. Such may include information that is not readily discernible without self reporting. The self reported specific demographic information may, for example, indicate a gender of an individual. The self reported specific demographic information may, for example, indicate an actual age of the individual (e.g., 47 year old). The self reported specific demographic information may, for example, indicate an income of an individual (e.g., $50,000 per year). The self reported specific demographic information may, for example, indicate an occupation of the individual (e.g., engineer, salesperson). The self reported specific demographic information may, for example, indicate interests of an individual (e.g., pilot, snorkeling, leisure reading). The self reported specific demographic information may, for example, indicate media preferences of an individual (e.g., certain periodicals, television or radio shows or stations).

A data structure may store advertisements in the form of a record with a variety of fields. The data structure may store an advertisement identifier that uniquely identifies an advertisement. The data structure may store advertisement content. The advertisement content may take many variety of forms, for example, audio files, video files, WebPages, banners, popup, or pop files. The advertisement content may be formed in any of a large variety of formats, for example, AVI, DivX, MPEG, SVCD, VCD, WMV, XVCD, XSVCD, MP3 files, MP4 files, HTML files, XML, Flash®, AAC, mov, H.264, MKV files, etc.

A data structure may store advertisement placement opportunity related information in the form of a record with a variety of fields. The data structure may store an advertisement placement opportunity identifier that uniquely identifies an advertisement placement opportunity. Such may correspond to an available segment or sub segment of programming. The data structure may store a medium identifier that identifies a type of medium in which the advertisement may run. The medium identifier may, for example, specify one or more of radio, television, Web, etc. mediums. The data structure may store a duration indication that specifies a duration (e.g., 15 seconds, 30 seconds, 60 seconds) of the available advertisement placement opportunity. The data structure may store a date and/or time identifier that uniquely identifies a date and/or time of the available advertisement placement opportunity. Such may specify date by day of year, by day of week, or season. Time may be specified in any desired time zone, for example, a time zone in which the programming will be broadcast. The data structure may store a guaranteed indication that specifies whether a content provider ensures that an advertisement if placed for the respective available advertisement placement opportunity is guaranteed to be broadcast, assuming the advertisement meets any guidelines or conditions applied by the respective content provider to advertising in its programming. The data structure may store a content provider identifier that specifies a content provider identifier that uniquely identifies a content provider (e.g., KUOW, WNEW, ABC, WABC, TBS) which will be broadcasting or otherwise transmitting the programming. The data structure may store a markets identifier that identifies one or more geographic markets (e.g., NYC, Pacific Northwest) or other markets (e.g., high technology, industrial supply) to which the advertisement is targeted. The data structure may store a language identifier that identifies a language (e.g., English, Spanish) of the programming associated with the available advertisement placement opportunity. It is likely that an advertiser will employ the same language for an advertisement as the language of the main programming since the audience may be expected to understand that language. The data structure may store general population demographic information that specifies the demographics of the generally audience(s) to which the programming and/or the content provider's broadcasting or Webcasting is targeted. The general population demographic information may include a large variety of information, for example, gender(s) (e.g., male, female, both), age(s) (e.g., 21-30 year olds), incomes (e.g., over $50,000 per year). Other or different generalized population demographic information may be employed.

The data structure may store specific demographic information that specifies the demographics of specific audience(s) or individual members of an audience to which the programming or the content provider's broadcasting or Webcasting is targeted. Such may be useful where information for particular individuals in an audience have been collected, for instance, automatically collected or collected via self-reporting by those individuals. The specific demographic information may include a large variety of information.

The specific demographic information may, for example, indicate a current location of an individual. The current location may be a fairly specific geographic location, which may be discernible, for example, from an Internet address, telephone area code and prefix, or from cellular location information. The current location may represent a type of location, for example, fixed or mobile, which may, for instance, be discerned from an Internet address or device type (e.g., Smartphone operating on cellular system versus operating on WI-FI, satellite radio, DSL line). The specific demographic information may, for example, indicate a device type employed by an individual. For instance, the device type may indicate a general device type (e.g., computer, tablet, Smartphone), or a more specific device type (e.g., manufacturer and model). Such may be determined, for example, by querying the device. The specific demographic information may, for example, indicate a bandwidth or level of service available to an individual. Available bandwidth may be discernible from the type of communications infrastructure involved, (e.g., cellular, WI-FI, DSL, cable modem) and/or device type.

The specific demographic information may, for example, include self reported demographic information. Such may include information that is not readily discernible without self reporting. The self reported specific demographic information may, for example, indicate a gender of an individual. The self reported specific demographic information may, for example, indicate an actual age of the individual (e.g., 47 year old). The self reported specific demographic information may, for example, indicate an income of an individual (e.g., $50,000 per year). The self reported specific demographic information may, for example, indicate an occupation of the individual (e.g., engineer, salesperson). The self reported specific demographic information may, for example, indicate interests of an individual (e.g., pilot, snorkeling, leisure reading). The self reported specific demographic information may, for example, indicate media preferences of an individual (e.g., certain periodicals, television or radio shows or stations).

The above examples of data structures, and examples of specific types of information are intended to be illustrative and not limiting. In some instances, additional information may be employed and some of the illustrated information omitted. Also, different data structures may be employed and/or the information may be stored in different data structures or different ways. For example, a separate content provider specific data structure may be employed to store information related to respective content providers. Also for example, a separate advertiser data structure may be employed to store information related to respective advertisers.

Overview of Operation

As a high level overview, in some implements an encoding device or component publishes a digital media stream or sequence of programming (e.g., terrestrial broadcast programming) to an inserter. The digital media stream contains markers indicating which digital media content is replaceable with alternative content and which is not considered replaceable.

A fragment encoder encodes at least the digital media content which is not considered replaceable as content or media fragments. In some implementations, the fragment encoder also encodes replacement digital media content which has been inserted or substituted into the digital media stream or sequence of programming upstream of a client or content consumer device. In other implementations, replacement digital media content is encoded as content or media fragments by a different fragment encoder, essentially independently or separately from the encoding of the digital media content which is not considered replaceable.

The content or media fragments are preferably created such that a beginning and an end of any replaceable content occurs on fragment boundaries, and not somewhere within a single fragment.

The fragment encoder or some other component distributes the content or media fragments to CDNs for public consumption. Because the manifests are essentially pointers to digital media files hosted on any number of arbitrary CDNs, the manifest generation logic can include 'least cost distribution' logic or can take into account customer preferences with respect to which CDNs carry what percent of their digital media traffic. CDNs may be selected to cache the content or media fragments based on a variety of criteria, for example cost considerations, customer (e.g., advertiser, advertiser network) preference, or to achieve a desired or defined geographical or network diversity or redundancy. For example, a customer may select to deliver the content in the following portions: 80% on Akamai, 10% on Level3, and 10% on Limelight. The allocation may, for example be indicated via a user interface of the alternative content manager and/or portal systems 113.

A content consumer's media player requests a manifest of digital media content, for example from a manifest generator and/or alternative content inserter. The request contains at least an IP address for the content consumer's content consumer device. Thus, alternative content such as advertisements can be targeted at least based on geographical location which is discernible from the IP address. The request may also contain any amount of additional data or information, including but not limited to user preferences, globally unique identifier, latitude and/or longitude coordinates, gender, etc. Thus, alternative content such as advertisements can be targeted based on other criteria.

The manifest generator dynamically creates a manifest of content or media fragments, including retrieval information for content or media fragments of the non-replaceable content of the programming and the replacement content. Thus, alternative ad content is seamlessly inserted into the programming. The manifest adheres to rules set forth with respect to CDN preferences and directs the media player to reference the digital media fragments from the appropriate CDN. The alternative or replacement content may be content that was selected to be heard by an entire audience, or it may have been targeted to an individual content consumer.

Operation with Insertion of Replacement Content at Content Inserter

As described above, in at least one implementation the alternative content inserter 171 may actually insert alternative or replacement content into programming. For example, the alternative content inserter 171 may replace one or more content segments identified as replaceable or likewise, respectively with one or more alternative or replacement content segments, in an alternate content stream of the programming from the terrestrial broadcast or original Webcast. In such implementations the alternative content inserter 171 both detects replaceable content segments, and actually inserts content into an alternate stream or sequence of content.

One way to implement such is to have the alternative content inserter 171 create a granular time frame of advertisement space (e.g., in multiples of 15 seconds) over top of an original advertisement in the terrestrial broadcast. For example, if the original break time in the terrestrial broadcast is 48 seconds, the alternative content inserter 171 may overlay 60 seconds worth of generic advertisement content (e.g., generic Internet advertisements). This would result in the alternative content inserter 171 recording or buffering or caching 12 seconds worth of the content from the terrestrial broadcast, while the last 12 seconds of the replacement content is played out to fill the newly created gap. The ultimate timing result being that the playback stream of the content from the terrestrial broadcast would be 12 seconds behind the real time terrestrial broadcast.

With this example, the advertisement break in the terrestrial broadcast ends is a total of 48 seconds. The alternative content inserter 171 may choose to play two advertisements that are of 30 seconds duration each, for a total inserted or injected content window of 60 seconds. At the point of selecting the first advertisement, which is 30 seconds in duration, the alternative content inserter 171 would mark the respective packet as a replacement period of 30 seconds. In turn, the selector 141 would run a query for 30 seconds worth of alternative or replacement content. This 30 seconds may include fractional durations, such as two 15 seconds advertisement segments, essentially selecting an amount of alternative or replacement content that adds up to the replaceable content period time. In response, the manifest generator 143 seamlessly replaces the manifest indices of the replaceable content, with manifest indices of the alternate content selections. The same procedure is followed with the second 30 second replacement period that the alternative content inserter 171 inserted, with the total resulting targeted replacement time of 60 seconds.

The alternative content inserter 171 may insert or substitute targeted alternative or replacement content identified by the selector 141, based on various criteria. If the selector 141 has not identified targeted alternative or replacement content, the alternative content inserter 171 may employ other alternative or replacement content identified by the alternative content inserter 171 itself.

Operation without Insertion of Replacement Content at Content Inserter

As described above, in at least one implementation the alternative content inserter 171 may not actually insert alternative or replacement content into programming, but rather only detect insertion opportunities. For example, the alternative content inserter 171 may detect the appearance of content segments which are identified as replaceable or likewise in the broadcast programming. In response, the alternative content inserter 171 may produce information characterizing these content segments of replaceable content. This information may be used to allow the manifest generator to dynamically generate manifests which include location information for retrieving content or media fragments for both content that was not identified as replaceable and alternative or replacement content. This advantageously avoids actually combining the alternative replacement content with the broadcast content at the alternative content inserter 171, and avoids having to encode the alternative or replacement content by the fragment encoder 173.

Thus, the alternative content inserter 171 continue detecting or marking the periods of alternate or replaceable content times, and reporting those to the manifest generator 143. As noted, the fragment encoder 173 only encodes the content of the terrestrial broadcast programming, not the alternative or replacement content. In this case, the resulting content or media fragments would only ever contain the content of the original terrestrial broadcast.

In a replacement period, the content or media fragments that are generated would be marked as replaceable content using, for example, one of four the fragment marking methods described above. The manifest generator 143 uses this information to change its state into the replacement period beginning. At this point, the selector 141 or manifest generator 143 automatically selects alternative or replacement content, and uses the fragment indices to generate new alternate content manifest indices. Notably, the alternative or replacement content can be theoretically any arbitrary length that is needed or desired.

In response to detecting an end of a period of replaceable content, the alternative content inserter 171 notifies the manifest generator 143 of this state or condition, for example via the various techniques described above in reference to fragment marking. The manifest generator 143 finishes distributing the indices of the alternative or replacement content that had been selected. The manifest generator 143 then resumes sending the indices of the original terrestrial broadcast programming, starting at the index of the time/fragment that marks the ending of the replacement content period.

This essentially has the same effect as buffering the original broadcast programming, making room for the alternative or replacement content. Advantageously, carving out alternative or replacement content periods by the alternative content inserter 171 would no longer have to be as granular, as the selector 141 and/or manifest generator 143 would no longer care about the size of the alternate content periods. The selector 141 and/or manifest generator 143 would only need to know when this particular period ended, and that the new content or media fragments coming in would be the start of the original terrestrial programming content.

Hybrid Operation

At least one implementation may take the form of a hybrid of the two operations described above, hence denominated as hybrid operation.

As in the operation with insertion of replacement content approach described above, the alternative content inserter 171 marks content segments of the terrestrial broadcast programming, and inserts or substitutes alternative or replacement content segments.

Similar to the operation without insertion of replacement content described above, the selector 141 or manifest generator 143 may select alternative or replacement content, and the manifest generator 143 may generate indices for alternative or replacement content which are longer than a duration indicated by marked fragments from the alternative content inserter 171. The manifest generator 143 also continues to monitor the indices of content or media fragments from the terrestrial broadcast programming or stream once the replaceable period is marked as complete, while the alternative or replacement content continues to be indexed out for the manifest content. This essentially results in a double buffering solution, where the manifest generator 143 may still fall back on the alternative content inserter 171 original alternative or replacement content, but not be restrained by a length of the alternate content window.

Specific Examples of Operation

Figure 4:
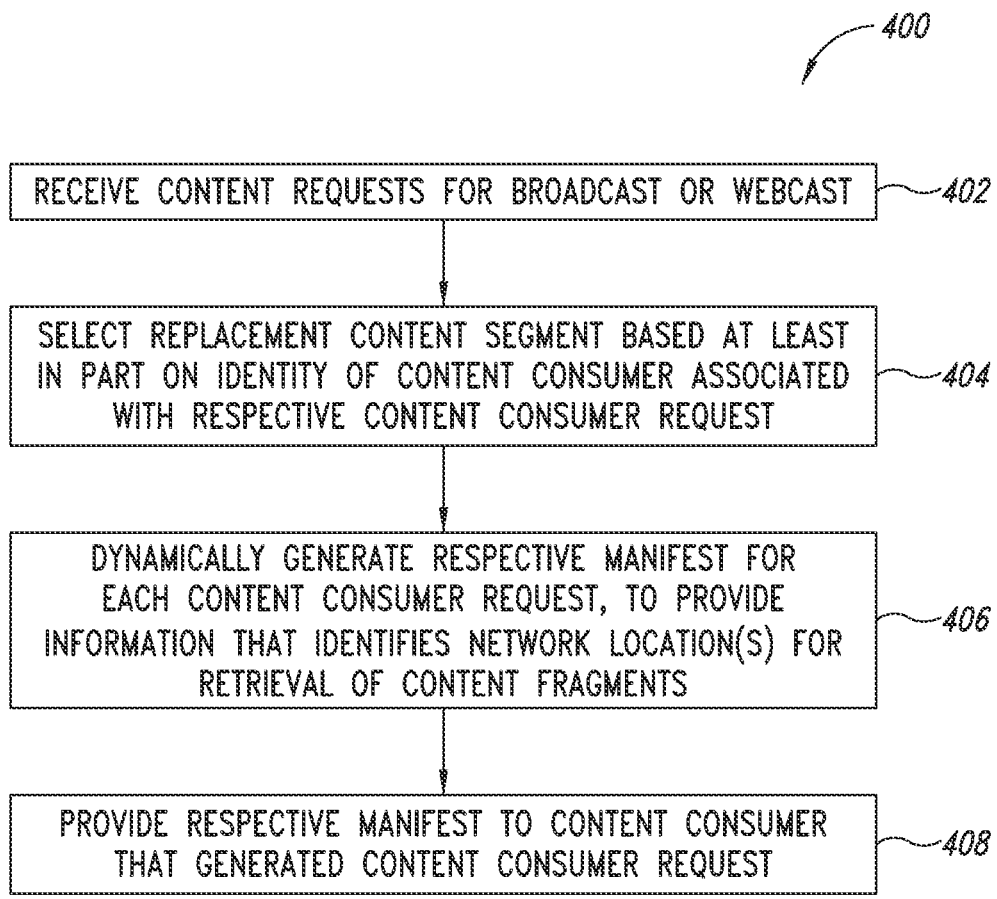
FIG. 4 shows a method of operating one or more components of a content delivery system to provide content to content consumers in a networked environment, according to one illustrated embodiment.

FIG. 4 shows a method 400 of operating one or more components of a content delivery system to provide content to content consumers in a networked environment, according to one illustrated embodiment.

At 402, a component (e.g., manifest generator) receives a plurality of content consumer requests for broadcasts or Webcasts. Terrestrial broadcasts or Webcasts each typically include a plurality of content segments. Some of the content segments are identified or identifiable as replaceable, while other are not replaceable. For example, local advertisement content may be identified as replaceable with the primary subject matter or content or programming of the broadcast or Webcast may be identified as non-replaceable. Such may be identified in metadata which may, or may not, be part of the content or broadcast or Webcast.

At 404, a component (e.g., selector, manifest generator, alternative content inserter) selects replacement content segment based at least in part on an identity of a content consumer associated with a respective content consumer request. The identity of the content consumer may be that of a content consumer device (e.g., computer, Smartphone, tablet, netbook) or an individual, for instance an individual associated with a content consumer device. Various methods of selection are discussed throughout this disclosure, and in particular in reference to FIG. 6.

At 406, a component (e.g., manifest generator) dynamically generates respective manifest for each content consumer request that provide information that identifies network location(s) for retrieval of content fragments. Dynamic generation includes the generation of manifests upon request for the content or programming from a data consumer or data consumer device. Typically the dynamically generated manifests provide retrieval information to retrieve at least some content or media fragments which are targeted based on information associated with the requesting content consumer or content consumer device.

At 408, a component (e.g., manifest generator) provides respective manifests to the content consumers that generated the respective content consumer request. Such may typically occur over a public communications infrastructure, although a private communications infrastructure may be employed in some implementations.

Figure 5:
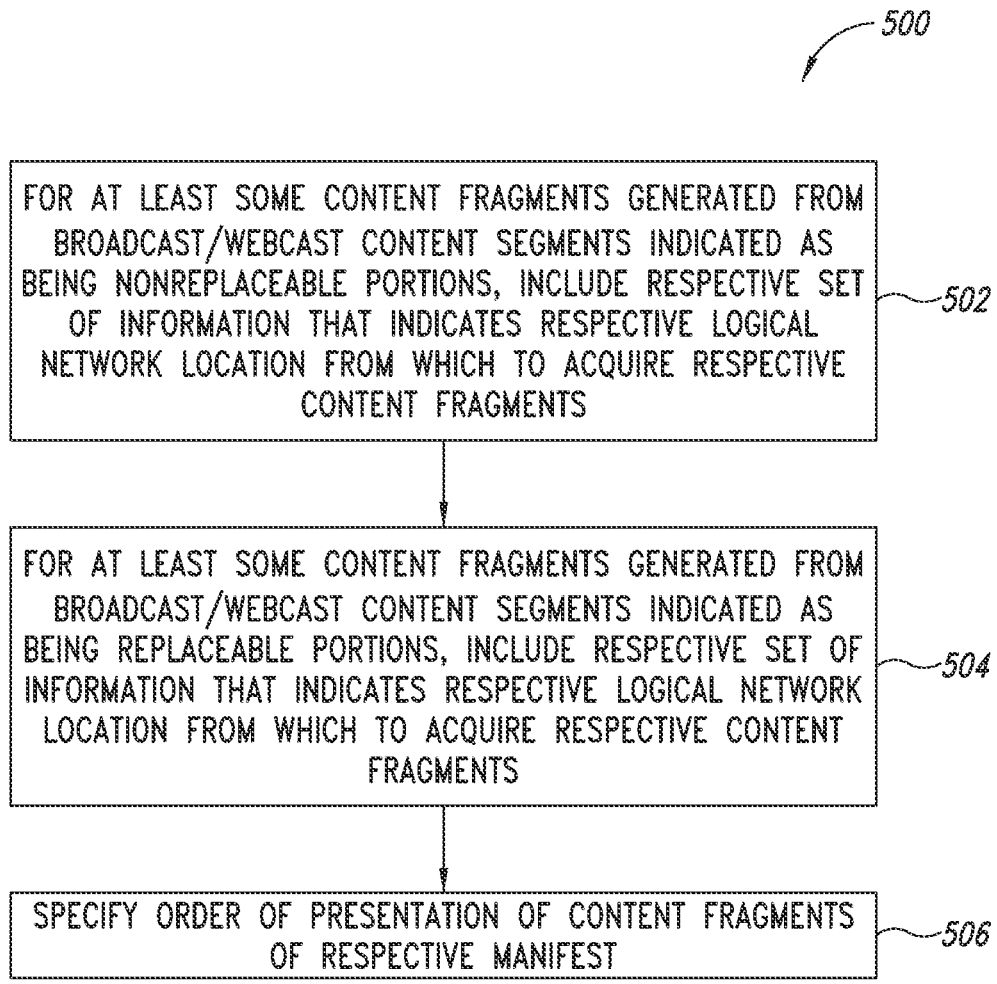
FIG. 5 shows a method of operating one or more components of a content delivery system to provide content to content consumers in a networked environment, according to one illustrated embodiment, which method may be useful in performing the dynamic manifest generation of the method of FIG. 4.

FIG. 5 shows a method 500 of operating one or more components of a content delivery system to provide content to content consumers in a networked environment, according to one illustrated embodiment. In particular, the method 500 may be useful in performing the dynamic manifest generation 406 of the method 400 (FIG. 4).

At 502, a component (e.g., manifest generator) includes a respective set of information that indicates a respective logical network location from which to acquire the respective content fragment, for at least some of a plurality of content fragments generated from the broadcast or the Webcast from any of the content segments of the broadcast or the Webcast which are indicated as being non-replaceable portions of the broadcast or Webcast.

At 504, a component (e.g., manifest generator) includes a respective set of information that indicates a respective logical network location from which to acquire respective replacement content fragments, for at least some of a plurality of content fragments generated from the broadcast or the Webcast from any of the content segments of the broadcast or Webcast which are indicated as being replaceable portions of the broadcast or Webcast. The replacement content fragments typically have content that is different from content of a respective one of the content fragments which the replacement content is to replace.

At 506, a component (e.g., manifest generator) specifies an order of presentation of the content fragments of the respective manifest. The order may be specified by an inherent ordering of content fragment information in the manifest.

Figure 6:
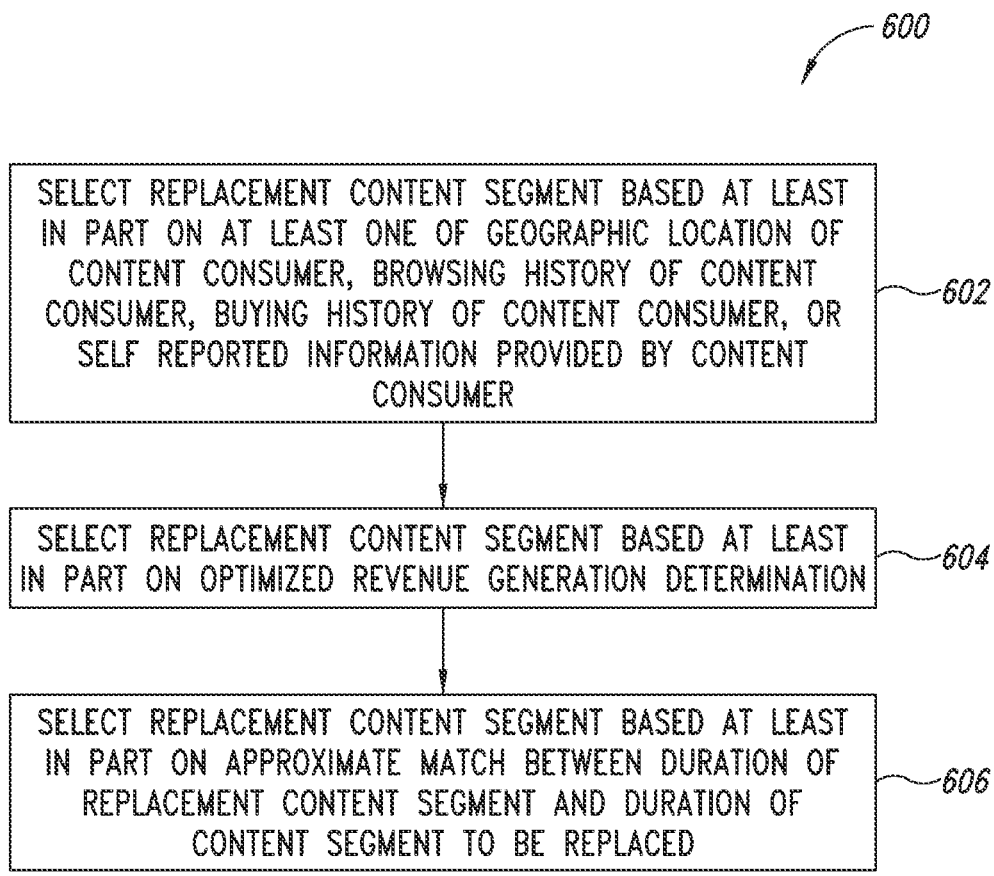
FIG. 6 shows a method of operating one or more components of a content delivery system to provide content to content consumers in a networked environment, according to one illustrated embodiment, which method may be useful in performing the selection of the method of FIG. 4.

FIG. 6 shows a method 600 of operating one or more components of a content delivery system to provide content to content consumers in a networked environment, according to one illustrated embodiment. In particular, the method 600 may be useful in performing the selection 404 of the method 400 (FIG. 4).

At 602, a component (e.g., selector, manifest generator) selects replacement content segments based at least in part on at least one of a geographic location of the content consumer, a browsing history of the content consumer, a buying history of the content consumer, or a piece of self reported information provided by the content consumer. Other information may be employed, some of which information is discussed above, for example in the discussion regarding data, databases, and nontransitory storage media.

At 604, a component (e.g., selector, manifest generator) selects replacement content segments based at least in part on an optimized revenue generation determination. For example, such may account for different revenue or costs associated with respective CDNs, and/or costs or pricing associated with respective advertisement placement opportunities and/or prices which certain advertisers are willing to pay for certain audiences and/or type of contact (e.g., views, click throughs, sales). Pricing information may be represented in various forms, such as cost per thousand (i.e., CPM) or cost per rating point (i.e., CPP), cost per acquisition (i.e., CPA), or any other of the forms commonly used in the industry. Pricing may also represent exchanges of value other than currency, for example agreements that would be denominated as barters.

Dynamic pricing may be employed, which may vary price (e.g., CPM) based on a current or present value of one or more variables. For example, a minimum or reserve price, represented for instance in CPM, may vary based on geographical proximity of an audience to a target location, for example increasing with increasing proximity or decreasing with decreasing proximity. Pricing may be automatically varied basted on other dynamic external factors. For example, weather may affect pricing. For instance, sunny weather may increase the pricing for car wash advertisements or ice cream, while rainy weather may increase the pricing for foul weather gear and umbrellas. Mortgage rates may affect the pricing of advertisements related to lenders or mortgage brokers, for example pricing increasing as mortgage rates fall. Stock prices may affect pricing of advertisements for investment firms. Such relationship may, or may not, be linear mathematical relationships, and may or may not be direct relationships or inverse relationships. The running of advertisements may be preconditioned upon occurrence or prediction of certain external conditions or events, for example certain weather conditions (e.g., sunny, rainy, severe storm) or other conditions (e.g., mortgage rates below a defined default value, or change in rate greater than a defined amount). Such may be further limited to the occurrence of the trigger condition happening in a specific geographic area, for example a geographic area in which the audience resides.

At 606, a component (e.g., selector, manifest generator) selects replacement content segment based at least in part on an approximate match between a duration of a replacement content segment and a duration of a content segment to be replaced. As discussed above, there are various techniques for buffering or otherwise not requiring alternative or replacement content segments to equal the content segments to be replaced. Yet in some instances, it may be beneficial to at least approximate a match in duration. In other instances, it may be desirable to find a match be a lag or lead in content delivery relative to a terrestrial broadcast or Webcast to reduce or minimize or even eliminate such.

Figure 7:
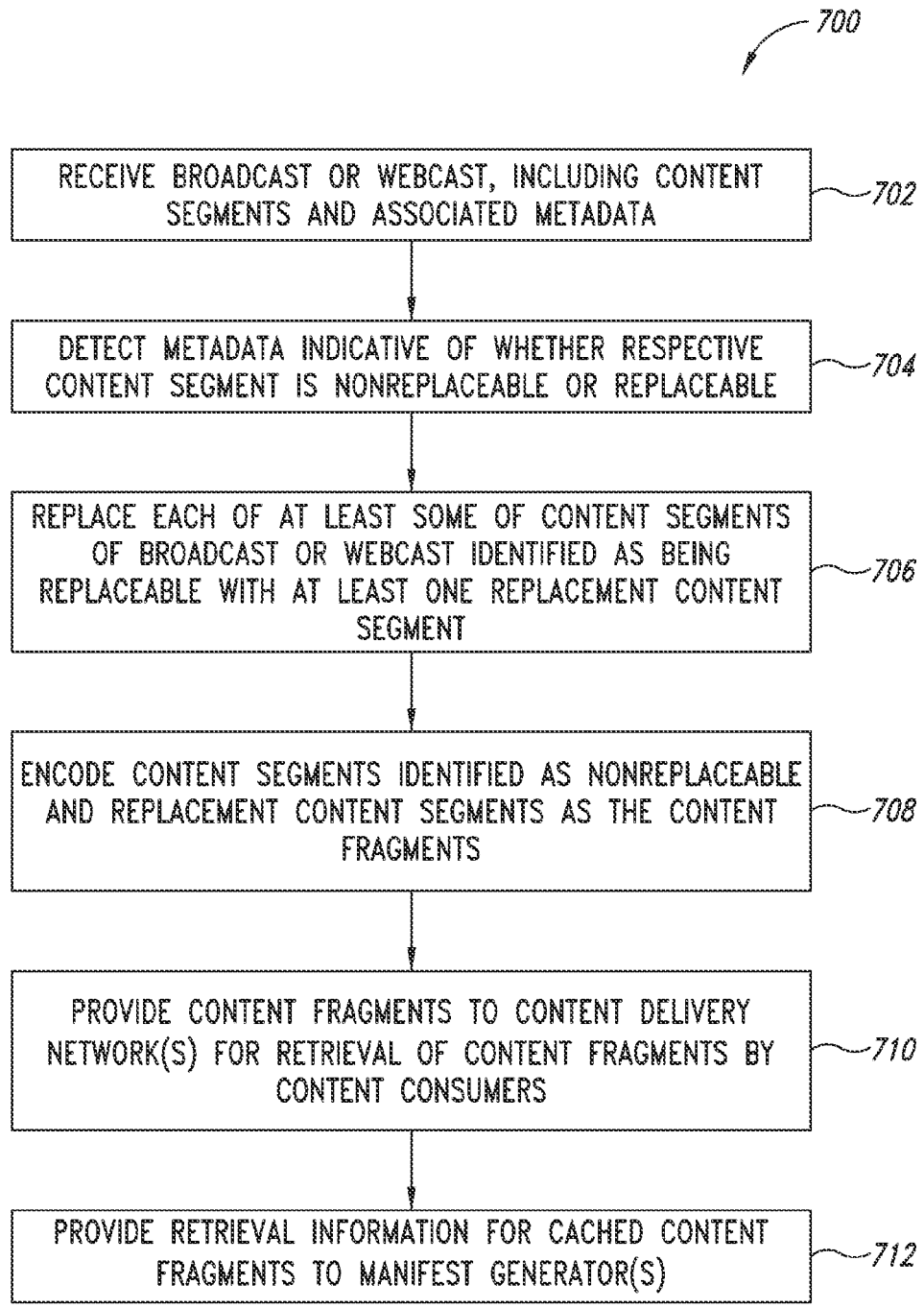
FIG. 7 shows a method of operating one or more components of a content delivery system to provide content to content consumers in a networked environment, according to one illustrated embodiment, which method may be useful in performing the method of FIG. 4, including inserting alternative or replacement content at the alternative content inserter.

FIG. 7 shows a method 700 of operating one or more components of a content delivery system to provide content to content consumers in a networked environment, according to one illustrated embodiment. In particular, the method 700 may be useful in performing the method 400 (FIG. 4) including inserting alternative or replacement content at the alternative content inserter.

At 702, a component (e.g., fragment encoder, alternative content inserter) receives broadcast or Webcast programming. The broadcast or Webcast programming typically include sequential content segments. The broadcast or Webcast programming typically include associated metadata. The associated metadata may specify whether the content segment is replaceable or not. The associated metadata may identify the start and/or end of a content segment or duration thereof.

At 704, a component (e.g., alternative content inserter, fragment encoder) detects metadata indicative of whether the respective content segment is non-replaceable or replaceable for each of a number of the content segments of the broadcast or the Webcast. Many techniques for marking content segments are discussed above.

At 706, a component (e.g., alternative content inserter) replaces each of at least some of the content segments of the broadcast or the Webcast identified as being replaceable with at least one replacement content segment. Such may be accomplished via an inserter switch. Such may also include buffering content in the broadcast or Webcast programming which is not to be replaced, particular where a duration of the alternative or replacement content segment(s) exceeds a duration of the content segment(s) being replaced.

At 708, a component (e.g., one or more fragment encoders) encodes the content segments identified as non-replaceable and the replacement content segments as the content fragments.

At 710, a component (e.g., fragment encoder) provides the content fragments to a number of content delivery networks for retrieval of the content fragments by the content consumers.

At 712, a component (e.g., fragment encoder) provides retrieval information for the content fragments to one or more manifest generators. Such may allow dynamic generation of manifests. Notably, the fragment encoder may, or may not be collocated with a content provider.

Figure 8:
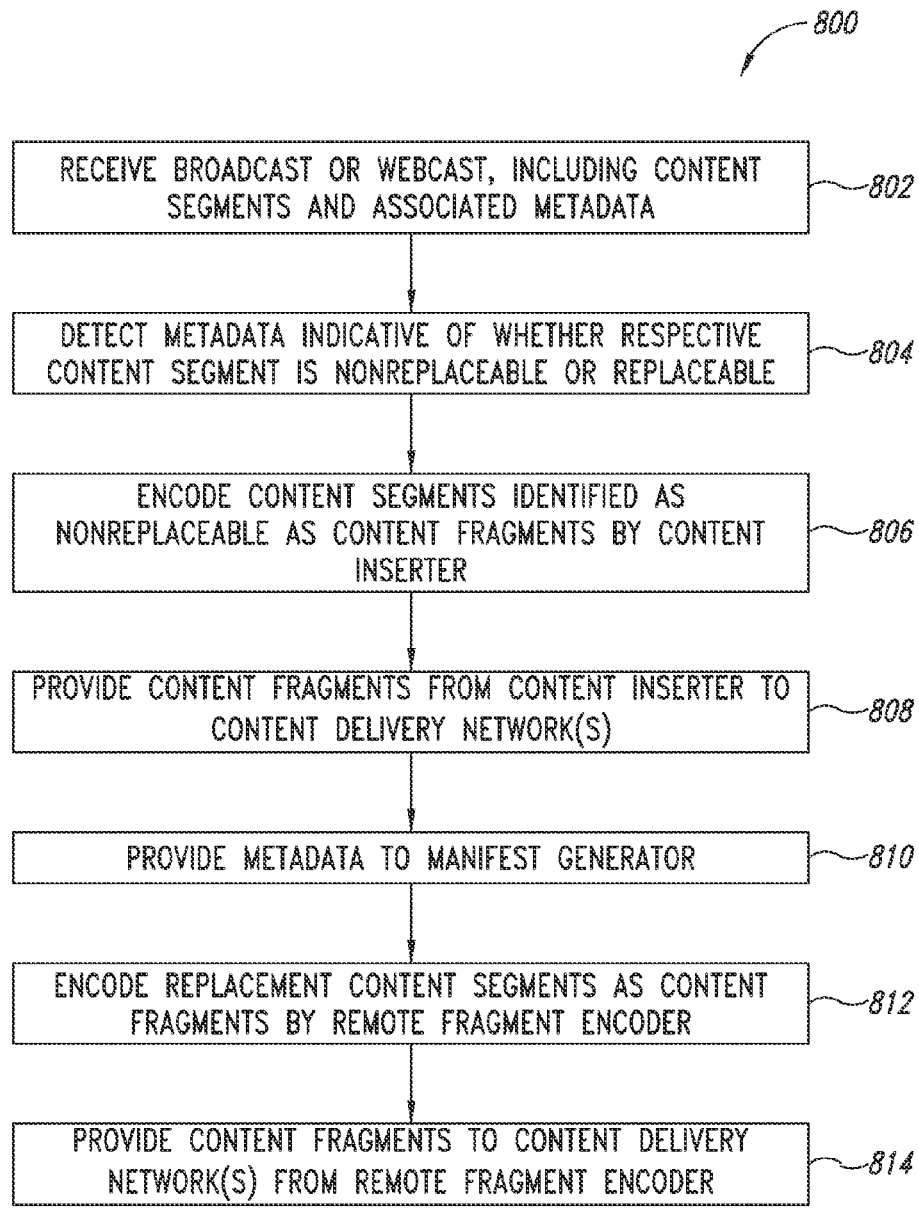
FIG. 8 shows a method of operating one or more components of a content delivery system to provide content to content consumers in a networked environment, according to one illustrated embodiment, which method may be useful in performing the method of FIG. 4, while avoiding inserting alternative or replacement content at the alternative content inserter.

FIG. 8 shows a method 800 of operating one or more components of a content delivery system to provide content to content consumers in a networked environment, according to one illustrated embodiment. In particular, the method 800 may be useful in performing the method 400 (FIG. 4) while avoiding inserting alternative or replacement content at the alternative content inserter.

At 802, a component (e.g., fragment encoder, alternative content inserter) receives broadcast or Webcast programming. The broadcast or Webcast programming typically include sequential content segments. The broadcast or Webcast programming typically include associated metadata. The associated metadata may specify whether the content segment is replaceable or not. The associated metadata may identify the start and/or end of a content segment or duration thereof.

At 804, a component (e.g., alternative content inserter, fragment encoder) detects metadata indicative of whether the respective content segment is non-replaceable or replaceable for each of a number of the content segments of the broadcast or the Webcast. Many techniques for marking content segments are discussed above.

At 806, a component (e.g., one or more fragment encoders) encodes content segments identified as non-replaceable as content or media fragments.

At 808, a component (e.g., fragment encoder) provides the content fragments to a number of content delivery networks for retrieval of the content fragments by the content consumers.

At 810, a component (e.g., alternative content inserter, fragment encoder) provides metadata to one or more manifest generators. The metadata allows the manifest generator to dynamically generate manifests indicative of retrieval locations of various content or media fragments into which the content has been broken.

At 812, a component (e.g., fragment encoder remote from alternative content inserter or fragment encoder associated with content provider) encodes replacement content segments as content or media fragments.

At 814, a component (e.g., alternative e.g., fragment encoder remote from alternative content inserter or fragment encoder associated with content provider) provides the content or media fragments to one or more content delivery network(s). The distribution or caching of the content or media fragments may be in accordance with some specified or defined CDN preference. Such may, for example, be based on a least cost routing, e.g., shortest network distance, fastest network distance, lowest monetary cost, etc.

Notably, in the method 800 the alternative or replacement content is first actually inserted or substituted in the programming at the content consumer device, for example by a media player executing on the content consumer device. This occurs downstream of the content inserter and fragment encoder. In contrast, in the method 700 the alternative or replacement content is first actually inserted or substituted in the programming at the alternative content inserter, upstream from the content consumer device.

Figure 9:
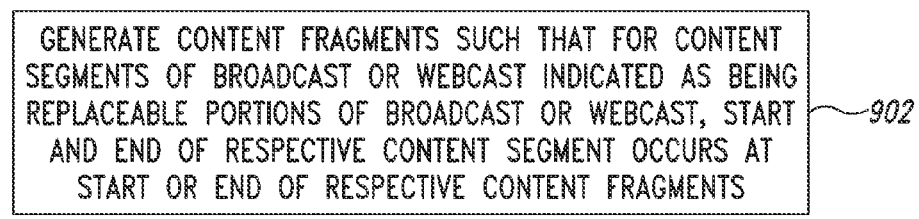
FIG. 9 shows a method of operating one or more components of a content delivery system to provide content to content consumers in a networked environment, according to one illustrated embodiment, which method may be useful in performing the encoding of the method of FIG. 8.

FIG. 9 shows a method 900 of operating one or more components of a content delivery system to provide content to content consumers in a networked environment, according to one illustrated embodiment. The method 900 may be useful in performing the encoding 812 of the method 800 (FIG. 8).

At 902, a component (e.g., alternative e.g., fragment encoder remote from alternative content inserter or fragment encoder associated with content provider) generates content or media fragments such that for content segments of broadcast or Webcast indicated as being replaceable portions of broadcast or Webcast, start and end of respective content segment occurs at start or end of respective content fragments.

Figure 10:
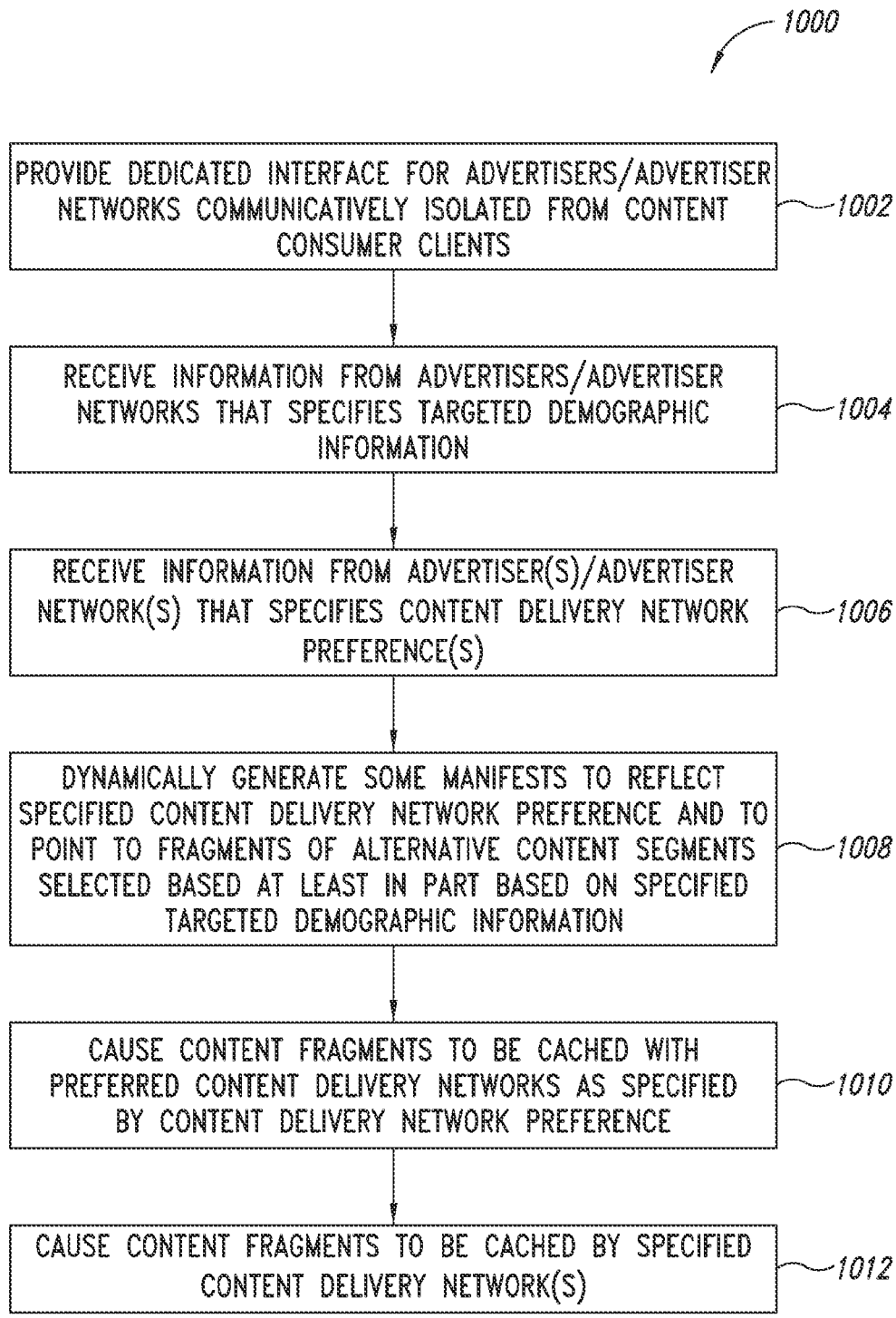
FIG. 10 shows a method of operating one or more components of a content delivery system to provide content to content consumers in a networked environment, according to one illustrated embodiment.

FIG. 10 shows a method 1000 of operating one or more components of a content delivery system to provide content to content consumers in a networked environment, according to one illustrated embodiment.

At 1002, a component (e.g., alternative content selection component) provides a dedicated interface for advertisers and advertiser networks. The dedicated interface may advantageously be communicatively isolated from receiving requests from the content consumer clients. For example, an extranet, intranet or virtual private network may be employed.

At 1004, a component (e.g., alternative content selection component) receives information from at least one advertiser or at least one advertiser network that specifies targeted demographic information.

At 1006, a component (e.g., alternative content selection component) receives information from at least one advertiser or at least one advertiser network that specifies at least one content delivery network preference.

At 1008, a component (e.g., dynamic manifest generator) dynamically generates some manifests to reflect specified content delivery network preference and/or to point to fragments of alternative content segments selected based at least in part based on specified targeted demographic information. Each of the dynamically generated manifests provides information that identifies one or more network locations for retrieval of one or more content fragments for each of the alternative content segments identified to replace the content segments of the respective requested broadcast or Webcast which are identified by the sets of metadata as being replaceable as well as one or more content fragments for each content segment of the respective requested broadcast or Webcast which are not identified by the sets of metadata as being replaceable.

At 1010, a component (e.g., alternative content section component, dynamic manifest generator, fragment encoder, alternative content inserter) causes content or media fragments to be cached with a number of preferred content delivery networks as specified by the at least one content delivery network preference.

At 1012, a component (e.g., dynamic manifest generator) transmits the dynamically generated manifests to respective content consumers that requested the broadcast or the Webcast.

Modifications

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary system generally described above.

For instance, network and even non-networked topologies other than those illustrated and/or described may be employed. For example, the selectors may be collocated with the manifest generators or separately therefrom. The selectors may be located remotely from the manifest generators, for instance "in the cloud" or even be collocated with the broadcasters or Webcasters, such as with the alternative content inserters. Also for example, the selectors and/or manifest generators may be collocated or may be geographically distributed with respect to one another, and/or with respect to the alternative content manager and/or portal systems. As a further example, the alternative content inserters may be located remotely from the broadcasters or Webcasters, or example "in the cloud." As noted above, the alternative content inserters may do nothing more than detect segments or periods of replaceable content which may indirectly trigger alternative content insertion.

When played on a client device, the client device is triggered by, or otherwise employs, the manifest to retrieve the content or media fragments into which the broadcast or Webcast programming and the replacement or substitute advertisements that replace or substitute for the original advertisements in the feed have been broken. The client device may retrieve the content or media fragments from a variety of different sources, for instance, one or more CDNs, an advertiser network server computer system, an advertising network, and/or a third party advertisement aggregator.

As previously explained, the replacement or substitute advertisements may be targeted to the intended audience and/or may be selected based on various external factors, as well as to maximize revenue generation. In this respect, one or more components may rely on metadata. This metadata may simply specify characteristics of the advertisement section which is being replaced, for example specifying a start time, stop time, duration, language, and/or demographic market. A component, for example a selector or an alternative content inserter may use the information, as well as additional information specific to the user to identify and/or retrieve the replacement or substitute advertisements. For example, the component may use information regarding a user's browsing habits or shopping habits stored in one or more cookies on the user device to identify and/or retrieve the replacement or substitute advertisements. Additionally, or alternatively, the component may use other information for example a current location (e.g., via GPS receiver or cellular triangulation), actual or predicted weather based on current location, to identify and/or retrieve the replacement or substitute advertisements. Alternatively, the metadata may directly specify the replacement or substitute advertisements or specify a location (i.e., logical address) for retrieving the replacement or substitute advertisements.

The selectors are triggered by, or otherwise employ, the metadata to retrieve replacement or substitute advertisements to replace or substitute for the original advertisements in the feed. The selectors may be server computer systems that retrieve the replacement or substitute advertisements from a variety of different sources, for instance, an advertiser network server computer system, an advertising network, and/or a third party advertisement aggregator. As previously explained, the replacement or substitute advertisements may be targeted to the intended audience and/or may be selected based on various external factors, as well as to maximize revenue generation. In this respect, metadata may simply specify characteristics of the advertisement section which is being replaced, for example specifying a start time, stop time, duration, language, and/or demographic market. The media server(s) may, for example, use the information, as well as additional information specific to the targeted end user to identify and/or retrieve the replacement or substitute advertisements. For example, the selector(s) may use information regarding a user's browsing habits or shopping habits stored in one or more cookies on the user device or elsewhere to identify and/or retrieve the replacement or substitute advertisements. Additionally, or alternatively, the selector(s) may use other information for example a current location (e.g., forwarded by a client device) and/or actual or predicted weather based on current location, to identify and/or retrieve the replacement or substitute advertisements. Alternatively, the metadata may directly specify the replacement or substitute advertisements or specify a location (i.e., logical address) for retrieving the replacement or substitute advertisements.

As discussed above, selection may be based at least in part on a monetary value realizable by the placements of the advertisements. Thus, the determination or selection may additionally, or alternatively be based on one or more other factors or parameters. For example, the determination or selection may be based at least in part on format, language, general demographic or specific demographic information, and/or duration or length of material. Such may be performed, for example, based on demographic information regarding the audience, demographic information regarding the target audience for the advertisement, and/or maximize advertising revenue generated by the advertisement insertions. Such may be responsive to a prioritization scheme or hierarchy. Various prioritization schemes or hierarchies may be employed. For example, highest priority may be given to already sold or bartered advertisements. Next highest priority may be given to advertising placements booked by one or more advertisement placement networks. Guaranteed advertisement placement opportunities may take precedence over non-guaranteed ones. The next highest priority may be given to advertisements sold by a station or local broadcaster or other content provider. Priority may then be based on various dynamic factors and or dynamic pricing. For example, certain reservations, requests or offers for advertising placement opportunities may produce higher revenue than other reservations, requests or offers for the same advertising placement opportunities. Such may, for example occur due to some external condition, even or circumstance. The preference scheme or hierarchy may automatically account for dynamic changes in pricing, inserting or causing the insertion of advertising the results in the highest revenue, or highest cumulative revenue for the content provider and/or advertisement placement network. Lowest in priority may, for example, include non-revenue producing, for instance public service announcements or a content providers own advertisements for its own content.

At least some of the implementations described herein take a server side approach. Taking a server side approach advantageously avoids the need to customize client code for each playback platform, while still providing targeted media for manifest/fragment capable media players. Depending on the approach taken, a client-side layer could still be added on top of the server-side layer to provide even more level of targeting detail and flexibility.

The implementations described herein can work with all current and future manifest protocols. Examples of current manifest protocols include: M3U8 (Apple HLS), ISML (MSFT Smooth), F4M (Adobe "San Jose"). An example of a possible future manifest protocol includes MPEG DASH or other follow on interrations.

As used herein digital media is used to refer to encoded content, for example encoded content which content is pro-gramming content for a terrestrial broadcast or Webcast. As used herein primary content refers to the original media stream, for example the programming content for a terrestrial broadcast or Webcast. As used herein alternative content refers to content that will replace some portion of the primary content, which typically is pre-encoded media. As used herein replaceable content refers to primary content that is flagged or other was identified or identifiable as being replaceable by alternative content. As used herein manifest content refers to a set of entries that specify locations and/or specific properties of content or media fragments, specifying a linear or sequential order. A used herein manifest consumer device refers to a client (e.g., media player executing on a processor-based device) that requests and utilizes manifest content. As used herein dynamic manifest refers to a manifest file that is generated upon a request of a manifest consumer device. As used herein content or media fragment refers to a digital media 'file' into which content has been broken, typically having a duration of 2-10 seconds. Presently, content or media fragments are primarily based on fragmented mp4 (FMP4) or MPEG TS (M2TS).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

All of the U.S. patents, U.S. patent application publications, U.S. patent applications, foreign patents, foreign patent applications and non-patent publications referred to in this specification and/or listed in the Application Data Sheet including but not limited to U.S. provisional patent application Ser. No. 61/587,475 filed Jan. 17, 2012 and entitled "SYSTEMS, METHODS AND ARTICLES TO PROVIDE CONTENT IN NETWORKED ENVIRONMENT," are incorporated herein by reference, in their entirety.

The various embodiments described above can be combined to provide further embodiments. To the extent that they are not inconsistent with the specific teachings and definitions herein, U.S. patent application Ser. No. 11/958,143, published as Publication No. 2008-0120638, and U.S. provisional patent application Ser. No. 61/561,186 filed Nov. 17, 2011 are each incorporated herein by reference, in their entireties. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of providing content to content consumers in a networked environment, the method comprising:
    for each of a number of content consumer requests for a broadcast or a Webcast comprising a plurality of content segments, generating a respective manifest by at least one processor, by:
    for at least some of a plurality of content fragments generated from the broadcast or the Webcast from any of the content segments of the broadcast or the Webcast which are indicated as being nonreplaceable portions of the broadcast or Webcast, including a respective set of information that indicates a respective logical network location from which to acquire the respective content fragment;
    for at least some of a plurality of content fragments generated from the broadcast or the Webcast from any of the content segments of the broadcast or Webcast which are indicated as being replaceable portions of the broadcast or Webcast, including a respective set of information that indicates a respective logical network location from which to acquire respective replacement content fragments, the replacement content fragments having content that is different from content of a respective one of the content fragments which the replacement content is to replace; and
    specifying an order of presentation of the content fragments of the respective manifest.

2. The method of claim 1, further comprising:
    selecting a replacement content segment based at least in part on an identity of a content consumer associated with the respective content consumer request.

3. The method of claim 2 wherein selecting a replacement content segment based at least in part on an identity of a content consumer includes selecting the replacement content segment based at least in part on at least one of a geographic location of the content consumer, a browsing history of the content consumer, a buying history of the content consumer, or a piece of self reported information provided by the content consumer.

4. The method of claim 1, further comprising:
    selecting a replacement content segment based at least in part on an optimized revenue generation determination.

5. The method of claim 2 wherein selecting a replacement content segment is further based at least in part on an approximate match between a duration of the replacement content segment and a duration of the content segment to be replaced.

6. The method of claim 1, further comprising:
    selecting a replacement content segment on a replacement content manager component remotely located from a manifest generator component which generates the respective manifests.

7. The method of claim 1, further comprising:
    receiving the broadcast or the Webcast, the broadcast or the Webcast including the content segments and associated metadata; and
    for each of a number of the content segments of the broadcast or the Webcast, detecting metadata indicative of whether the respective content segment is nonreplaceable or replaceable.

8. The method of claim 7, further comprising:
    replacing each of at least some of the content segments of the broadcast or the Webcast identified as being replaceable with at least one replacement content segment; and encoding the content segments identified as nonreplaceable and the replacement content segments as the content fragments.

9. The method of claim 8, further comprising:
providing the content fragments to a number of content delivery networks for retrieval of the content fragments by the content consumers.

10. The method of claim 8, further comprising:
providing the respective manifest to the content consumer that generated the content consumer request.

11. The method of claim 8 wherein the replacing and the encoding are performed on a content insertion component which is collocated with a content source and are not communicatively accessible by the content consumers.

12. The method of claim 1, further comprising:
generating the plurality of content fragments such that for each any of the content segments of the broadcast or Webcast which are indicated as being replaceable portions of the broadcast or Webcast, a start and an end of the respective content segment occurs at a start or an end of one of a respective one the content fragments.

13. The method of claim 1, further comprising:
encoding the content segments identified as nonreplaceable content by a first fragment encoder; and
encoding the replacement content segments by a second fragment encoder, separate and remote from the first content encoder.

14. A content delivery system to deliver content in a networked environment, the content delivery system comprising:
a manifest generator comprising at least one processor and at least one nontransitory processor readable storage medium communicatively coupled to the at least one processor and which stores instructions executable by the at least one processor which causes the manifest generator to generate a respective manifest for each of a number of content consumer requests for a broadcast or a Webcast comprising a plurality of content segments, by:
for at least some of a plurality of content fragments generated from the broadcast or the Webcast from any of the content segments of the broadcast or the Webcast which are indicated as being nonreplaceable portions of the broadcast or Webcast, including a respective set of information that indicates a respective logical network location from which to acquire the respective content fragment;
for at least some of a plurality of content fragments generated from the broadcast or the Webcast from any of the content segments of the broadcast or Webcast which are indicated as being replaceable portions of the broadcast or Webcast, including a respective set of information that indicates a respective logical network location from which to acquire respective replacement content fragments, the replacement content fragments having content that is different from content of a respective one of the content fragments indicated as being replaceable; and
specifying an order of presentation of the content fragments of the respective manifest; and
which further causes the manifest generator to provide the respective manifest to a content consumer that generated the content consumer request.

15. The content delivery system of claim 14, further comprising:
a content replacement selection component comprising at least one processor and at least one nontransitory processor readable storage medium communicatively coupled to the at least one processor and which stores instructions executable by the at least one processor which causes the content replacement selection component to select replacement content segments based at least in part on an identity of a content consumer includes selecting the replacement content segment based at least in part on at least one of a geographic location of the content consumer, a browsing history of the content consumer, a buying history of the content consumer, or a piece of self reported information provided by the content consumer.

16. The content delivery system of claim 15 wherein the content replacement selection component selects replacement content segments based at least in part on an optimized revenue generation determination.

17. The content delivery system of claim 15 wherein the content replacement selection component selects replacement content segments based at least in part minimizing a delay between a presentation of the content of the broadcast or Webcast with the replacement and the presentation of the content of the broadcast or Webcast without the replacement.

18. The content delivery system of claim 15, further comprising:
an insertion component comprising at least one processor and at least one nontransitory processor readable storage medium communicatively coupled to the at least one processor and which stores instructions executable by the at least one processor which causes the insertion component to:
receive the broadcast or the Webcast, the broadcast or the Webcast including the content segments and associated metadata;
for each of a number of the content segments of the broadcast or the Webcast, detect metadata indicative of whether the respective content segment is nonreplaceable or replaceable;
replace each of at least some of the content segments of the broadcast or the Webcast identified as being replaceable with at least one replacement content segment; and
encode the content segments identified as nonreplaceable and the replacement content segments as the content fragments; and
provide the content fragments to a number of content delivery networks for retrieval of the content fragments by the content consumers.

19. The content delivery system of claim 18 wherein the manifest generation component is communicatively accessible by the content consumer, the content replacement selection component is communicatively accessible by at least one of an advertiser or an advertiser network and is not communicatively accessible by the content consumer, and wherein the insertion component is located remotely from the content replacement selection component and is collocated with a content source and are not communicatively accessible by the content consumer.

20. The content delivery system of claim 14, further comprising:
a fragment encoder that generates the plurality of content fragments such that for each any of the content segments of the broadcast or Webcast which are indicated as being replaceable portions of the broadcast or Webcast, a start and an end of the respective content segment occurs at a start or an end of one of a respective one the content fragments.

21. The content delivery system of claim 14, further comprising:
   a first fragment encoder that encode the content segments identified as nonreplaceable content; and
   a second fragment encoder that encodes the replacement content segments separately and remotely from the first content encoder.

22. A method of providing content to a plurality of content consumer clients in a networked environment where at least some of the content is from a plurality of broadcasts or Webcasts by a number of broadcast or Webcast content providers, each broadcast or Webcast comprising a plurality of sequential content segments, the method comprising:
   for a plurality of the content segments identified by a respective set of metadata as replaceable, identifying a number of alternate content segments by an alternative content selection component that includes at least one processor and at least one nontransitory storage medium communicatively coupled to the at least one processor, the alternate content segments to be used to replace at least some of the content segments of the broadcast or the Webcast which are identified by the respective set of metadata as replaceable;
   in response to a plurality of requests by a plurality of content consumer clients for the broadcasts or the Webcasts, dynamically generating a plurality of respective manifests by a manifest generator component that includes at least one processor and at least one nontransitory storage medium communicatively coupled to the at least one processor, each of the dynamically generated manifests providing information that identifies one or more network locations for retrieval of one or more content fragments for each of the alternative content segments identified to replace the content segments of the respective requested broadcast or Webcast which are identified by the sets of metadata as being replaceable as well as one or more content fragments for each content segment of the respective requested broadcast or Webcast which are not identified by the sets of metadata as being replaceable; and
   transmitting the dynamically generated manifests to respective content consumers that requested the broadcast or the Webcast.

23. The method of claim 22 wherein the alternative content selection component provides a dedicated interface for advertisers and advertiser networks and is communicatively isolated from receiving requests from the content consumer clients, and further comprising:
   receiving information from at least one advertiser or at least one advertiser network that specifies at least one content delivery network preference; and
   wherein dynamically generating a plurality of respective manifests by a manifest generator component includes dynamically generating at least some of respective manifests to reflect the specified at least one content delivery network preference.

24. The method of claim 22, further comprising:
   causing content fragments to be cached with a number of preferred content delivery networks as specified by the at least one content delivery network preference.

25. The method of claim 22 wherein the alternative content selection component provides a dedicated interface for advertisers and advertiser networks and is communicatively isolated from receiving requests from the content consumer clients, and further comprising:
   receiving information from at least one advertiser or at least one advertiser network that specifies targeted demographic information; and
   wherein dynamically generating a plurality of respective manifests by a manifest generator component includes dynamically generating at least some of respective manifests to include alternative content segments selected based at least in part based on the specified targeted demographic information.

26. The method of claim 22 wherein identifying a number of alternate content segments by an alternative content selection component includes identifying at least some of the alternative content segments based at least in part on an optimization of revenue generated by the alternative content segments.

27. The method of claim 22 wherein identifying a number of alternate content segments by an alternative content selection component includes identifying alternative content segments based at least in part on at least one of a geographic location of the content consumer client, a browsing history of a content consumer associated with the content consumer client, a buying history of the content consumer associated with the content consumer client, or a piece of self reported information provided by the content consumer associated with the content consumer client.

28. The method of claim 22, further comprising:
   replacing each of at least some of the content segments of the broadcast or the Webcast identified as being replaceable with at least one alternative content segment by a content insertion component which is collocated with a content source and are not communicatively accessible by the content consumers;
   encoding as a plurality of content fragments the alternative content segments and the content segments which are not identified by the sets of metadata as being replaceable; and
   providing the content fragments to a number of content delivery networks for retrieval of the content fragments by the content consumers.

29. The method of claim 22, further comprising:
   receiving encrypted content fragments from each of a plurality of fragment encoders by a Web-based portal;
   decrypting the received content fragments; and
   distributing the decrypted content fragments to selected ones of a plurality of content delivery networks from the Web-based portal.

30. A content delivery system to provide content to a plurality of content consumer clients in a networked environment where at least some of the content is from a plurality of broadcasts or Webcasts by a number of broadcast or Webcast content providers, each broadcast or Webcast comprising a plurality of sequential content segments, the content delivery system comprising:
   an alternative content selection component that includes at least one processor and at least one nontransitory storage medium communicatively coupled to the at least one processor, and which, for a plurality of the content segments identified by a respective set of metadata as replaceable, identifies a number of alternate content segments to be used to replace at least some of the content segments of the broadcast or the Webcast which are identified by the respective set of metadata as replaceable; and
   a manifest generator component that includes at least one processor and at least one nontransitory storage medium communicatively coupled to the at least one processor, and that, in response to a plurality of requests by a plurality of content consumer clients for the broadcasts or the Webcasts, dynamically generates a plurality of respective manifests each of the dynamically generated manifests providing information that identifies one or more network locations for retrieval of one or more content fragments for each of the alternative content segments identified to replace the content segments of the respective requested broadcast or Webcast which are identified by the sets of metadata as being replaceable as well as one or more content fragments for each content segment of the respective requested broadcast or Webcast which are not identified by the sets of metadata as being replaceable; and that transmits the dynamically generated manifests to respective content consumers that requested the broadcast or the Webcast.

31. The content delivery system of claim 30 wherein the alternative content selection component provides a dedicated interface for advertisers and advertiser networks and is communicatively isolated from receiving requests from the content consumer clients, and further:
receives information from at least one advertiser or at least one advertiser network that specifies at least one content delivery network preference; and
dynamically generates at least some of respective manifests to reflect the specified at least one content delivery network preference.

32. The content delivery system of claim 30 wherein the alternative content selection component provides a dedicated interface for advertisers and advertiser networks and is communicatively isolated from receiving requests from the content consumer clients, and further:
receives information from at least one advertiser or at least one advertiser network that specifies targeted demographic information; and
dynamically generates at least some of respective manifests to include alternative content segments selected based at least in part based on the specified targeted demographic information.

33. The content delivery system of claim 30 wherein the alternative content selection component identifies at least some of the alternative content segments based at least in part on an optimization of revenue generated by the alternative content segments.

34. The content delivery system of claim 30 wherein the alternative content selection component identifies at least some of the alternate content segments based at least in part on at least one of a geographic location of the content consumer client, a browsing history of a content consumer associated with the content consumer client, a buying history of the content consumer associated with the content consumer client, or a piece of self reported information provided by the content consumer associated with the content consumer client.

35. The content delivery system of claim 30, further comprising:
a content insertion component which is collocated with a content source and are not communicatively accessible by the content consumers, the content insertion component including at least one processor and at least one nontransitory storage medium communicatively coupled with the at least one processor, and which:
replaces each of at least some of the content segments of the broadcast or the Webcast identified as being replaceable with at least one alternative content segment encoding as a plurality of content fragments the alternative content segments and the content segments which are not identified by the sets of metadata as being replaceable; and
provides the content fragments to a number of content delivery networks for retrieval of the content fragments by the content consumers.

36. The content delivery system of claim 30, further comprising:
a Web-based portal that receives encrypted content fragments from each of a plurality of fragment encoders, decrypts the content fragments, and distributes the decrypted content fragments to selected ones of a plurality of content delivery networks.

* * * * *

UNITED STATES PATENT AND TRADEMARK OFFICE
CERTIFICATE OF CORRECTION

PATENT NO. : 8,996,712 B2  
APPLICATION NO. : 13/744139  
DATED : March 31, 2015  
INVENTOR(S) : Robert D. Green et al.

Page 1 of 1

It is certified that error appears in the above-identified patent and that said Letters Patent is hereby corrected as shown below:

Title page

Item 71 Applicant:
"Abacast, Inc., Vancouver, WA (US)" should read as --Wideorbit Inc., San Francisco, CA (US)--

Item 56 Other Publications
"Green et al., "Systems and Methods to Delver a Persanalized Mediacast With an Uninterrupted Lead-In Portion." Preliminary Amendment filed Sep. 15, 2014, for U.S. Appl. No. 14/485416, 13 pages."
Should read:
--Green et al., "Systems and Methods to Deliver a Personalized Mediacast With an Uninterrupted Lead-In Portion." Preliminary Amendment filed Sep. 15, 2014, for U.S. Appl. No. 14/485416, 13 pages.--

Claims

Column 45, Line 21, Claim 8
"end of one of a respective one the content fragments" should read --end of one of a respective one of the content fragments--

Column 47, Line 3, Claim 21
"a first fragment encoder that encode the content segments" should read --a first fragment encoder that encodes the content segments--

Signed and Sealed this  
Twenty-fourth Day of November, 2015

Michelle K. Lee  
*Director of the United States Patent and Trademark Office*